(12) United States Patent
Wood et al.

(10) Patent No.: US 9,866,630 B2
(45) Date of Patent: *Jan. 9, 2018

(54) SYSTEM, METHOD AND APPARATUS FOR MEDIA SUBMISSION

(71) Applicant: Summit 6 LLC, Dallas, TX (US)

(72) Inventors: Lisa T. Wood, Danville, CA (US);
Scott M. Lewis, Midway, UT (US);
Robin T. Fried, Prague (CZ)

(73) Assignee: Summit 6 LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,500

(22) Filed: Jul. 3, 2016

(65) Prior Publication Data

US 2017/0063984 A1    Mar. 2, 2017

Related U.S. Application Data

(63) Continuation of application No. 14/107,261, filed on Dec. 16, 2013, now Pat. No. 9,386,094, which is a continuation of application No. 13/098,090, filed on Apr. 29, 2011, now Pat. No. 8,612,515, which is a continuation of application No. 12/831,503, filed on Jul. 7, 2010, which is a continuation of application No. 10/961,720, filed on Oct. 8, 2004, now Pat. No. 7,765,482, which is a continuation of application No. 09/357,836, filed on Jul. 21, 1999, now Pat. No. 6,895,557.

(51) Int. Cl.
*H04L 29/08* (2006.01)
*H04L 29/06* (2006.01)
*G06Q 30/02* (2012.01)

(52) U.S. Cl.
CPC ......... *H04L 67/1091* (2013.01); *G06Q 30/02* (2013.01); *H04L 67/14* (2013.01); *H04L 67/42* (2013.01); *Y10S 707/99943* (2013.01)

(58) Field of Classification Search
CPC ....... H04L 65/602; H04L 67/06; H04L 67/10; H04L 67/1095; G06Q 30/02; Y10S 707/99943
USPC ........ 709/219, 217, 203, 205, 201; 715/748, 715/744, 769, 733; 725/115, 145
See application file for complete search history.

(56) References Cited

U.S. PATENT DOCUMENTS

| | | |
|---|---|---|
| 4,802,008 A | 1/1989 | Walling |
| 4,862,200 A | 8/1989 | Hicks |
| 5,001,628 A | 3/1991 | Johnson et al. |

(Continued)

FOREIGN PATENT DOCUMENTS

| | | |
|---|---|---|
| EP | 0838774 A2 | 4/1998 |
| EP | 0930774 A2 | 7/1999 |

(Continued)

OTHER PUBLICATIONS

Emily Cohen, "Set Your Sites High," PC Magazine, May 26, 1998.

(Continued)

*Primary Examiner* — Alina N Boutah
(74) *Attorney, Agent, or Firm* — Duane S. Kobayashi

(57) ABSTRACT

A system, method and apparatus for media submission. The submission mechanism is configurable to perform a variable amount of intelligent preprocessing on media objects prior to upload. In the example of digital images, the tool can perform sizing and formatting, for example.

27 Claims, 5 Drawing Sheets

(56) References Cited

U.S. PATENT DOCUMENTS

| | | |
|---|---|---|
| 5,063,587 A | 11/1991 | Semasa et al. |
| 5,179,637 A | 1/1993 | Nardozzi |
| 5,235,680 A | 8/1993 | Bijnagte |
| 5,327,265 A | 7/1994 | McDonald |
| 5,404,316 A | 4/1995 | Klingler et al. |
| 5,477,353 A | 12/1995 | Yamasaki |
| 5,479,206 A | 12/1995 | Ueno |
| 5,493,677 A | 2/1996 | Balogh et al. |
| 5,555,388 A | 9/1996 | Shaughnessy |
| 5,606,365 A | 2/1997 | Maurinus et al. |
| 5,608,542 A | 3/1997 | Krahe et al. |
| 5,636,294 A | 6/1997 | Grosse et al. |
| 5,666,159 A | 9/1997 | Parulski et al. |
| 5,666,215 A | 9/1997 | Fredlund et al. |
| 5,675,507 A | 10/1997 | Bobo, II |
| 5,678,046 A | 10/1997 | Cahill et al. |
| 5,694,546 A | 12/1997 | Reisman |
| 5,696,850 A | 12/1997 | Parulski et al. |
| 5,706,457 A | 1/1998 | Dwyer et al. |
| 5,715,397 A | 2/1998 | Ogawa et al. |
| 5,729,741 A | 3/1998 | Liaguno et al. |
| 5,734,915 A * | 3/1998 | Roewer ............... G06F 3/04845 715/202 |
| 5,734,923 A * | 3/1998 | Sagawa ................ G06T 11/60 345/474 |
| 5,748,194 A | 5/1998 | Chen |
| 5,751,950 A | 5/1998 | Crisan |
| 5,754,172 A | 5/1998 | Kubota et al. |
| 5,760,916 A | 6/1998 | Dellert et al. |
| 5,760,917 A | 6/1998 | Sheridan |
| 5,761,404 A | 6/1998 | Murakami et al. |
| 5,761,601 A | 6/1998 | Nemirofsky et al. |
| 5,765,152 A | 6/1998 | Erickson |
| 5,774,670 A | 6/1998 | Montulli |
| 5,778,164 A | 7/1998 | Watkins et al. |
| 5,778,198 A | 7/1998 | Kadota |
| 5,778,430 A | 7/1998 | Ish et al. |
| 5,781,725 A | 7/1998 | Saito |
| 5,781,773 A | 7/1998 | Vanderpool et al. |
| 5,781,901 A | 7/1998 | Kuzma |
| 5,787,459 A | 7/1998 | Stallmo et al. |
| 5,787,466 A | 7/1998 | Berliner |
| 5,790,708 A | 8/1998 | Delean |
| 5,794,217 A | 8/1998 | Allen |
| 5,799,063 A | 8/1998 | Krane |
| 5,764,235 A | 9/1998 | Hunt et al. |
| 5,802,312 A | 9/1998 | Lazaridis et al. |
| 5,802,314 A | 9/1998 | Tullis et al. |
| 5,802,518 A | 9/1998 | Karaev et al. |
| 5,806,005 A | 9/1998 | Hull et al. |
| 5,809,280 A | 9/1998 | Chard et al. |
| 5,813,009 A | 9/1998 | Johnson et al. |
| 5,844,969 A | 9/1998 | Goldman et al. |
| 5,819,032 A | 10/1998 | De Vries et al. |
| 5,819,092 A | 10/1998 | Ferguson et al. |
| 5,835,627 A | 11/1998 | Higgins |
| 5,835,735 A | 11/1998 | Mason et al. |
| 5,845,299 A | 12/1998 | Arora et al. |
| 5,848,415 A | 12/1998 | Guck |
| 5,852,435 A * | 12/1998 | Vigneaux ......... G06F 17/30017 345/428 |
| 5,859,956 A | 1/1999 | Sugiyama et al. |
| 5,864,632 A * | 1/1999 | Ogawa ................ G06T 17/05 382/113 |
| 5,875,296 A | 2/1999 | Shi et al. |
| 5,880,740 A | 3/1999 | Halliday et al. |
| 5,890,170 A | 3/1999 | Sidana |
| 5,890,213 A | 3/1999 | Sokolov |
| 5,897,622 A | 4/1999 | Blinn et al. |
| 5,903,277 A | 5/1999 | Sutherland et al. |
| 5,903,728 A | 5/1999 | Semenzato |
| 5,907,640 A | 5/1999 | Delean |
| 5,911,776 A | 6/1999 | Guck |
| 5,913,088 A | 6/1999 | Moghadam et al. |
| 5,918,213 A | 6/1999 | Bernard et al. |
| 5,923,846 A | 7/1999 | Gage et al. |
| 5,926,116 A | 7/1999 | Kitano et al. |
| 5,926,288 A | 7/1999 | Dellert et al. |
| 5,933,600 A | 8/1999 | Shieh et al. |
| 5,933,646 A | 8/1999 | Hendrickson et al. |
| 5,937,232 A | 8/1999 | Taguchi et al. |
| 5,953,488 A | 9/1999 | Seto |
| 5,956,716 A | 9/1999 | Kenner et al. |
| 5,960,411 A | 9/1999 | Hartman et al. |
| 5,974,401 A | 10/1999 | Enomoto et al. |
| 6,005,613 A | 12/1999 | Endsley |
| 6,006,231 A | 12/1999 | Popa |
| 6,012,068 A | 1/2000 | Boezeman et al. |
| 6,017,157 A | 1/2000 | Garfinkle et al. |
| 6,018,774 A * | 1/2000 | Mayle ................ G06Q 10/107 709/203 |
| 6,023,241 A | 2/2000 | Clapper |
| 6,026,431 A | 2/2000 | Hinrichs |
| 6,028,603 A | 2/2000 | Wang et al. |
| 6,035,323 A | 3/2000 | Narayen et al. |
| 6,038,295 A | 3/2000 | Mattes |
| 6,058,399 A | 5/2000 | Morag et al. |
| 6,058,417 A | 5/2000 | Hess et al. |
| 6,058,428 A | 5/2000 | Wang et al. |
| 6,075,528 A | 6/2000 | Curtis |
| 6,076,111 A | 6/2000 | Chiu et al. |
| 6,084,581 A | 7/2000 | Hunt |
| 6,085,195 A | 7/2000 | Hoyt et al. |
| 6,085,249 A | 7/2000 | Wang et al. |
| 6,088,732 A | 7/2000 | Smith et al. |
| 6,091,930 A * | 7/2000 | Mortimer ................ G09B 5/14 434/118 |
| 6,092,078 A | 7/2000 | Adolfsson |
| 6,092,114 A | 7/2000 | Shaffer et al. |
| 6,094,684 A | 7/2000 | Pallmann |
| 6,097,389 A | 8/2000 | Morris et al. |
| 6,104,468 A | 8/2000 | Bryniarski et al. |
| 6,118,480 A | 9/2000 | Anderson et al. |
| 6,119,101 A | 9/2000 | Peckover |
| 6,125,352 A | 9/2000 | Franklin et al. |
| 6,128,600 A | 10/2000 | Imamura et al. |
| 6,128,655 A | 10/2000 | Fields et al. |
| 6,133,985 A | 10/2000 | Garfinkle et al. |
| 6,167,382 A | 12/2000 | Sparks et al. |
| 6,167,442 A | 12/2000 | Sutherland et al. |
| 6,167,469 A | 12/2000 | Safai et al. |
| 6,167,568 A | 12/2000 | Gandel et al. |
| 6,177,934 B1 | 1/2001 | Sugiura et al. |
| 6,182,116 B1 | 1/2001 | Namma et al. |
| 6,182,279 B1 | 1/2001 | Buxton |
| 6,189,008 B1 | 2/2001 | Easty et al. |
| 6,199,082 B1 * | 3/2001 | Ferrel ................ G06F 17/3089 707/E17.005 |
| 6,202,061 B1 | 3/2001 | Khosla et al. |
| 6,223,190 B1 * | 4/2001 | Aihara ................ G06F 17/211 348/207.99 |
| 6,226,618 B1 | 5/2001 | Downs et al. |
| 6,233,590 B1 | 5/2001 | Shaw et al. |
| 6,233,600 B1 | 5/2001 | Salas et al. |
| 6,233,611 B1 | 5/2001 | Ludtke |
| 6,237,010 B1 * | 5/2001 | Hui ........................ G06T 17/00 345/428 |
| 6,253,216 B1 | 6/2001 | Sutcliffe et al. |
| 6,266,681 B1 | 7/2001 | Guthrie |
| 6,275,829 B1 | 8/2001 | Angiulo et al. |
| 6,281,874 B1 | 8/2001 | Sivan et al. |
| 6,282,549 B1 | 8/2001 | Hoffert |
| 6,289,115 B1 | 9/2001 | Takeo |
| 6,301,586 B1 | 10/2001 | Yang et al. |
| 6,301,607 B2 | 10/2001 | Barraclough et al. |
| 6,308,188 B1 | 10/2001 | Bernardo et al. |
| 6,320,588 B1 | 11/2001 | Palmer et al. |
| 6,320,672 B1 | 11/2001 | Itoh |
| 6,324,538 B1 | 11/2001 | Wesinger et al. |
| 6,324,545 B1 | 11/2001 | Morag |
| 6,327,049 B1 | 12/2001 | Ohtsuka |
| 6,330,572 B1 | 12/2001 | Sitka |
| 6,330,575 B1 * | 12/2001 | Moore ............... G06Q 30/0603 707/E17.116 |

(56) References Cited

U.S. PATENT DOCUMENTS

| | | |
|---|---|---|
| 6,343,302 B1 | 1/2002 | Graham |
| 6,353,445 B1 | 3/2002 | Babula et al. |
| 6,370,193 B1 | 4/2002 | Lee |
| 6,374,260 B1 | 4/2002 | Hoffert et al. |
| 6,381,029 B1 | 4/2002 | Tipirneni |
| 6,385,596 B1 | 5/2002 | Wiser et al. |
| 6,421,429 B1 | 7/2002 | Merritt et al. |
| 6,424,429 B1 | 7/2002 | Takahashi et al. |
| 6,456,591 B1 | 9/2002 | Mishra |
| 6,489,954 B1 | 12/2002 | Powlette |
| 6,489,980 B1 | 12/2002 | Scott et al. |
| 6,501,472 B1 | 12/2002 | Hunt et al. |
| 6,502,194 B1 | 12/2002 | Berman et al. |
| 6,505,160 B1 | 1/2003 | Levy et al. |
| 6,510,418 B1 | 1/2003 | Case et al. |
| 6,513,069 B1 | 1/2003 | Abato et al. |
| 6,516,340 B2 | 2/2003 | Boys |
| 6,519,046 B1 | 2/2003 | Kinjo |
| 6,519,632 B1 | 2/2003 | Brackett et al. |
| 6,522,418 B2 | 2/2003 | Yokomizo et al. |
| 6,532,079 B1 | 3/2003 | Serex et al. |
| 6,532,312 B1 | 3/2003 | Corkran |
| 6,535,294 B1 | 3/2003 | Arledge et al. |
| 6,535,296 B1 | 3/2003 | Oak |
| 6,539,420 B1 | 3/2003 | Fields et al. |
| 6,542,936 B1 | 4/2003 | Mayle et al. |
| 6,567,122 B1 | 5/2003 | Anderson et al. |
| 6,567,983 B1 | 5/2003 | Shiimori |
| 6,571,271 B1 | 5/2003 | Savitzky et al. |
| 6,583,799 B1 | 6/2003 | Manolis et al. |
| 6,621,938 B1 | 9/2003 | Tanaka et al. |
| 6,628,417 B1 | 9/2003 | Naito et al. |
| 6,657,702 B1 | 12/2003 | Chui et al. |
| 6,690,417 B1 | 2/2004 | Yoshida et al. |
| 6,693,635 B1 | 2/2004 | Yokomizo |
| 6,711,297 B1 | 3/2004 | Chang et al. |
| 6,718,340 B1 | 4/2004 | Hartman et al. |
| 6,721,802 B1 | 4/2004 | Wright et al. |
| 6,732,162 B1 | 5/2004 | Wood et al. |
| 6,792,575 B1 | 9/2004 | Samaniego |
| 6,799,165 B1 | 9/2004 | Boesjes |
| 6,853,461 B1 | 2/2005 | Shiimori |
| 6,871,231 B2 | 3/2005 | Morris |
| 6,895,557 B1 | 5/2005 | Wood et al. |
| 6,930,709 B1 | 8/2005 | Creamer et al. |
| 7,010,587 B1 | 3/2006 | Shiimori |
| 7,024,456 B1 | 4/2006 | Simonoff |
| 7,032,030 B1 | 4/2006 | Codignotto |
| 7,036,081 B2 | 4/2006 | Powlette |
| 7,038,713 B1 | 5/2006 | Matama |
| 7,043,527 B2 | 5/2006 | Shiimori et al. |
| 7,146,575 B2 | 12/2006 | Manolis et al. |
| 7,158,172 B2 | 1/2007 | Kawaoka et al. |
| 7,246,147 B2 | 7/2007 | Kim et al. |
| 7,257,158 B2 | 8/2007 | Figueredo et al. |
| 7,263,497 B1 | 8/2007 | Wiser et al. |
| 7,280,702 B2 | 10/2007 | Chang et al. |
| 7,308,413 B1 | 12/2007 | Tota et al. |
| 7,313,604 B2 | 12/2007 | Wood et al. |
| 7,315,386 B1 | 1/2008 | Shiimori et al. |
| 7,509,270 B1 | 3/2009 | Hendricks et al. |
| 7,624,344 B2 | 11/2009 | Mindrum et al. |
| 7,761,537 B2 | 7/2010 | Wood et al. |
| 7,765,482 B2 | 7/2010 | Wood et al. |
| 8,001,218 B2 | 8/2011 | Wood et al. |
| 8,175,420 B2 | 5/2012 | Sposato et al. |
| 8,392,532 B2 | 3/2013 | Wood et al. |
| 8,612,515 B2 | 12/2013 | Wood et al. |
| 9,386,094 B2 | 7/2016 | Wood et al. |
| 9,426,208 B2 | 8/2016 | Wood et al. |
| 2002/0067500 A1* | 6/2002 | Yokomizo ............... G06T 11/60 358/1.15 |
| 2002/0091725 A1 | 7/2002 | Skok |
| 2004/0039795 A1 | 2/2004 | Percival |
| 2005/0239454 A1 | 10/2005 | Kawashima et al. |
| 2005/0262437 A1 | 11/2005 | Patterson et al. |
| 2008/0201236 A1 | 8/2008 | Field et al. |

FOREIGN PATENT DOCUMENTS

| | | |
|---|---|---|
| EP | 1076302 A1 | 2/2001 |
| JP | 8-153183 | 6/1996 |
| JP | 11-69072 | 3/1999 |
| JP | 11-184943 | 7/1999 |
| WO | WO 97/04353 A1 | 2/1997 |
| WO | WO 97/39580 A1 | 10/1997 |
| WO | WO 98/11728 A1 | 3/1998 |
| WO | WO 98/36556 A1 | 8/1998 |
| WO | WO 98/49631 A2 | 11/1998 |
| WO | WO 99/19811 A3 | 4/1999 |

OTHER PUBLICATIONS

Plante et al., "The NCSA Astronomy Digital Image Library: From Data Archiving to Data Publishing," Sep. 21, 1998.

Augot et al., "Secure Delivery ofImages over Open Networks," Proceedings of the IEEE, vol. 87, Issue 7, pp. 1251-1266, Jul. 1999.

Persits, Peter, "Browser-Based File Uploading Under the Microscope," 15 Seconds, Nov. 21, 1998.

Dean, Doug, "Down and Dirty Browser Uploading with a VB ASP Component," Mar. II, 1999.

Horstmann et al., "Distributed Authoring on the Web with the BSCW Shared Workspace System," StandardView, vol. 5, No. I, Mar. 1997.

Netscape Communications Corporation, "Creating Web Pages," Apr. 27, 1999.

Steinberg, Jill, "New Start-Up Releases Java Application and Enabling Software," JavaWorld, Oct. I, 1996.

Bilson, Rob, "Net-It Central 1.0," IDM, Jul. 31, 1997.

Warp 10 Technologies Inc., Jul. 10, 1998.

Pictra Incorporated, Nov. 11, 1998.

Letter from Terry Anderson to Craig Hamway, Oct. 16, 1997.

PictureWorks ADP Demo, May I, 1998.

Letter from Terry Anderson to Ken Karutz, May I, 1998.

Email from Scott Lewis to Lisa Wood, Jul. 2, 1998.

Email from Robin Fried to Scott Lewis et al., Jul. 5, 1998.

Email from Scott Lewis to Robin Fried, Jul. 8, 1998.

Email from Robin Fried to Martha White, Jul. 9, 1998.

Email from Robin Fried to Scott Lewis et al., Jul. 9, 1998.

Email from Don Strickland to Lisa Wood et al., Jul. 14, 1998.

Emails from Scott Lewis to Lisa Wood et al., Jul. 17-18, 1998.

Picture Works Technology, Inc. Board Update, Jun. 20, 1998.

Letter from Terry Anderson, Jul. 22, 1998.

Email from Don Strickland to Lisa Wood et al., Jul. 22, 1998.

Emails from Don Strickland, Jul. 27 and Aug. 7, 1998.

Email from Robin Fried to Scott Lewis et al., Jul. 28, 1998.

Email from Scott Lewis to Lisa Wood et al., Jul. 29, 1998.

Prioritized Activities for Enterprise Team, Jul. 31, 1998.

Email from Don Strickland to Criag Hamway, Aug. 2, 1998.

Board Update from Don Strickland, Aug. 7, 1998.

Email from Lisa Wood, Aug. 10, 1998.

Email from Scott Lewis to Terry Anderson, Aug. 13, 1998.

Letter from Terry Anderson to Randy Kau, Aug. 14, 1998.

Email from Kirby Lunger to Don Strickland et al., Aug. 14, 1998.

Email from Kirby Lunger to Lisa Wood, Aug. 26, 1998.

Email from Terry Anderson to Don Strickland, Aug. 25, 1998.

Email from Kirby Lunger to Lisa Wood, Aug. 31, 1998.

Email from Robin Fried to Scott Lewis et al., Sep. 1, 1998.

Email from Scott Lewis to Lisa Wood et al., Sep. 1, 1998.

Email from Don Strickland to Terry Anderson et al., Sep. 8, 1998.

Email from Scott Lewis to Jeff Paradise, Sep. 11, 1998.

Letter from Terry Anderson to Howard Latham, Sep. 15, 1998.

Email from Scott Lewis to Jim McCarthy, Sep. 17, 1998.

Email from Terry Anderson to Don Strickland et al., Sep. 18, 1998.

Email from Scott Lewis to Lisa Wood et al., Sep. 22, 1998.

Letter from Anthony Delli Colli to Wayne Mangold, Sep. 18, 1998.

Email from Scott Lewis to Lisa Wood et al., Sep. 23, 1998.

(56) References Cited

OTHER PUBLICATIONS

Email from Robin Fried to Stu Roberson, Sep. 21, 1998.
Letter from Terry Anderson to Sei-Wai Lee, Sep. 24, 1998.
Email from Scott Lewis to Lisa Wood, Sep. 25, 1998.
Email from Terry Anderson to Lisa Wood et al., Sep. 29, 1998.
Letter from Scott Lewis to Karim El-Fishaway, Oct. 2, 1998.
Email from Anthony Delli Colli to Stu Roberson et al., Oct. 2, 1998.
PictureWorks presentation to eBay, Oct. 16, 1998.
Letter from Scott Lewis to Gary Dillabough, Oct. 20, 1998.
Email from Don Strickland to PWT Employees, Oct. 31, 1998.
Press Release, Moore Data Management Services and PictureWorks Technology Inc., Announce Partnership to Revolutionize Use of Real Estate Photos on the Internet, Nov. 6, 1998.
Press Release, PictureWorks Technology Inc., Streamlines Posting of Photos to the Internet, Nov. 6, 1998.
Email from Laurie Fleming to Andrew Hunter et al., Nov. 13, 1998.
Letter from Scott Lewis to Wayne Graves, Nov. 16, 1998.
Email from Scott Lewis to Terry Anderson et al., Nov. 20, 1998.
Screenshots from Prepare and Post Video, Nov. 20, 1998.
Laura Roe, "New Software Gives Real Estate a View of the Future," National Real Estate Investor, Dec. 1, 1998.
PictureWorks Information, Dec. 9, 1998.
PictureWorks Prepare & Post, Fourth Quarter, 1998.
Prepare & Post Product Overview, Fourth Quarter, 1998.
Letter from Terry Anderson to Neil Shafran, Jan. 12, 1999.
Letter from Stu Roberson to James Rowley, Jan. 29, 1999.
Product Picks, Realtor Magazine, Feb. 1, 1999.
PictureWorks Kodak Presentation, Feb. 24, 1999.
Letter from Don Strickland to Phil Ashe, Mar. 2, 1999.
PictureWorks ADP Presentation, Mar. 11, 1999.
PictureWorks Press Release, "PictureWorks Releases New Free Digital Imaging Software; MediaCenter Offers Essential Tools for Web Imaging," Mar. 31, 1999.
PictureWorks Press Release, "PictureBay.com to Give-Away 30 Digital Cameras in 30 Days," Apr. 12, 1999.
PictureWorks Press Release, "PictureWorks Technology's PictureBay Solves #1 Frustration of eBay Members, Adding Pictures to Auctions," Apr. 12, 1999.
PictureWorks Press Release, "PictureWorks Technology'S Rimfire Empowers any Website to Easily Accept, Process, and Display Visitor Photos and Media," Apr. 12, 1999.
Rimfire real-time integrated media brochure, Apr. 12, 1999.
Letter from Terry Anderson to Jonathan Graff, Apr. 26, 1999.
Sales Update, Apr. 30, 1999.
"PictureWorks Plans to Become Powerhouse in Internet Imaging—Exclusive Interview with CEO," The Future Image Report, vol. 7, Issue 1, May 1, 1999.
Email from Laurie Fleming to Terry Anderson et al., May 7, 1999.
Roland Woerner et al., "eBay for Dummies," Chapter 12, May 10, 1999.
Letter from Scott Lewis to Rolan Woerner, May 10, 1999.
Letter from Stu Roberson to Jim Ferras, May 25, 1999.
Rimfire real-time integrated media, May 27, 1999.
Letter from Scott Lewis to Candace Gates, May 28, 1999.
Letter of Intent between PictureWorks Technology, Inc. and Auction Universe, May 31, 1999.
Letter from Scott Lewis to Matthew Lengfelder, Jun. 1, 1999.
"Casio and PictureWorks Announce Co-Branding and Distribution Agreement; MediaCenter Offers Essential Tools for Web Imaging," Jun. 3, 1999.
Sales Update, Jun. 4, 1999.
Email from Laurie Fleming to Terry Anderson et al., Jun. 7, 1999.
PictureWorks pricing for prototype, Jun. 9, 1999.
PictureWorks proposal, Jun. 9, 1999.
PictureWorks scope of work, Jun. 9, 1999.
Letter from Terry Anderson to Amazon, Jun. 9, 1999.
"PictureWorks Announces Co-Branding and Distribution Agreements with On-Line Photo Services Companies," Jun. 14, 1999.
PictureWorks Polaroid presentation, Jun. 15, 1999.
Email from Lisa Wood to Don Strickland et al., Jun. 30, 1999.

East Bay Business Times, "PictureWorks Founder Keeps True to Original Vision," Jul. 2, 1999.
PictureWorks Technology Proposal, Jul. 9, 1999.
Press Release, "PictureWorks Releases New, Free Imaging Weblication; MediaCenter 1.1 Offers Essential Photo Tools for Internet Imaging and Web Publishing, Ideal for Digital Camera Users," Jul. 19, 1999.
Press Release, "Picturebay is the Fastest and Easiest Way to Add Pictures to Auctions," Aug. 3, 1999.
Picturebay Screenshot, Oct. 13, 1999.
Office Action dated Sep. 6, 2002 for U.S. Appl. No. 09/440,461.
Office Action dated Apr. 21, 2003 for U.S. Appl. No. 09/440,461.
Office Action dated Nov. 23, 2001 for U.S. Appl. No. 09/357,836.
Office Action dated Jun. 5, 2002 for U.S. Appl. No. 09/357,836.
Office Action dated Nov. 8, 2002 for U.S. Appl. No. 09/357,836.
Office Action dated Jun. 4, 2003 for U.S. Appl. No. 09/357,836.
Office Action dated 02122/2007 for U.S. Appl. No. 10/736,285.
Office Action dated Oct. 17, 2008 for U.S. Appl. No. 11/935,340.
Office Action dated Aug. 11, 2009 for U.S. Appl. No. 11/935,340.
Office Action dated Jan. 4, 2011 for U.S. Appl. No. 12/790,487.
Fred Delobaerde, "Development of Multimedia Courseware Technology for Use in Hydrology and Water Management Instruction," Thesis, Department of Agricultural and Biosystems Engineering, McGill University, Aug. 1998.
McDonald, Glenn, "Pictra Puts Your Photo Album on the Web for Free," PC World, Jun. 13, 1997.
Pictra Incorporated website, Oct. 9, 1997.
"Pictra first to make publishing and sharing photo albums over Internet a snap for PC users; award-winning software offers easy, fun way to create digital photo albums to share over Internet," Business Wire, May 12, 1997. (Missing pp. 3-4).
Blatner, David, "The Automatic Publisher," Macworld, May 1999.
Weger, Chuck, "Stick to the Script," American Printer, Dec. 1995.
Lowe et al., "WebReport: A World Wide Web Based Clinical Multimedia Reporting System," 1996.
Lowe et al., "The Image Engine™ HPCC Project. A Medical Digital Library System using Agent-Based Technology to Create an Integrated View of the Electronic Medical Record," Proceedings of ADL, 1996.
Adding Images to the Engine Database, Jun. 25, 1997.
Image Engine Client, Jun. 25, 1997.
Bodoh, Dan, "Making the Most of the Internet for Failure Analysis," Proceedings from the 24th International Symposium for Testing and Failure Analysis, Nov. 15-19, 1998.
Martiner, William, "Visual Basic Programmer's Guide to Web Development," Chapters 1 and 12, John Wiley & Sons, 1997.
Degenhart, Curt, "AOL in a Nutshell: A Desktop Guide to America Online," O'Reilly Media, Jul. 8, 1998.
Popa, Sorin, "WarpRes™ Technology—White Paper," Jan. 14, 1998.
Warp 10 Technologies, Inc., "Rubie's Costumes Warps into High Tech," Jan. 21, 1998.
Kervella et al., "MHEGAM—A Multimedia Messaging System," 1997.
Schurmami, Gerd, "Multimedia mail," Multimedia Systems, Springer Verlag, 1996.
Internet Assistant for PowerPoint, The PowerPoint 95 to World Wide Web Document Converter, Feb. 2, 1996.
Microsoft, Internet Assistant for PowerPoint, Nov. 20, 1996.
Bernard, Ryan, "The Corporate Intranet," 2nd Edition, 1996.
InfoAccess Home Page, Jan. 12, 1998.
InfoAccess, HTML Transit, Jan. 12, 1998.
Postel et al., "File Transfer Protocol," Oct. 1985.
Garner et al., "The application of telepresence in medicine," BT Technology Journal, vol. 15, No. 4, Oct. 1997.
M. Sirbu, "A Content-Type Header Field for Internet Messages," Mar. 1988.
Borenstein et al., "MIME (Multipurpose Internet Mail Extensions): Mechanisms for Specifying and Describing the Format of Internet Message Bodies," Jun. 1992.
N. S. Borenstein, "MIME and Metamail: Making Multimedia Mail More Mainstream," USENIX Conference, Jan. 29, 1993.
Novell, GroupWise, Version 4.1, 1994.

(56) References Cited

OTHER PUBLICATIONS

Open Mobile Alliance, "Multimedia Messaging Service—Encapsulation Protocol," Version 1.1, Oct. 2002.
ETSI, "Digital Cellular telecommunications system (Phase 2+); Technical realization of the Short Message Service (SMS) Point-to-Point (PP)," GSM 03.40, Version 5.3.0, Jul. 1996.
3'd Generation Partnership Project; Technical Specification Group Terminals; Multimedia Messaging Service (MMS); Functional description; Stage 2, 3G TS 23.140 version 0.1.0, Oct. 1999.
CCITT, Information Technology—Digital Compression and Coding of Continuous-Tone Still Images—Requirements and Guidelines, Recommendation T.81, Sep. 1992.
Knowledge Base, "In Unix, what is metamail and how do I use it?," Dec. 2, 2009.
T. Negrino, "Dueling HTML editors," Macworld, Dec. 1996.
*Summit 6 LLC*, v. *Research in Motion Corporation, et al.*, Civil Action No. 3:11-CV-00367-0, Defendants' Invalidity Contentions, Sep. 9, 2011.
*Summit 6 LLC*, v. *Research in Motion Corporation, et al.*, Civil Action No. 3:11-CV-00367-0, Exhibit A1 of Defendants' Invalidity Contentions, Sep. 9, 2011.
*Summit 6 LLC*, v. *Research in Motion Corporation, et al.*, Civil Action No. 3:11-CV-00367-0, Exhibit A2 of Defendants' Invalidity Contentions, Sep. 9, 2011.
*Summit 6 LLC*, v. *Research in Motion Corporation, et al.*, Civil Action No. 3:11-CV-00367-0, Exhibit A3 of Defendants' Invalidity Contentions, Sep. 9, 2011.
*Summit 6 LLC*, v. *Research in Motion Corporation, et al.*, Civil Action No. 3:11-CV-00367-0, Exhibit A4 of Defendants' Invalidity Contentions, Sep. 9, 2011.
*Summit 6 LLC*, v. *Research in Motion Corporation, et al.*, Civil Action No. 3:11-CV-00367-0, Exhibit AS of Defendants' Invalidity Contentions, Sep. 9, 2011.
*Summit 6 LLC*, v. *Research in Motion Corporation, et al.*, Civil Action No. 3:11-CV-00367-0, Exhibit A6 of Defendants' Invalidity Contentions, Sep. 9, 2011.
*Summit 6 LLC*, v. *Research in Motion Corporation, et al.*, Civil Action No. 3:11-CV-00367-0, Exhibit A7 of Defendants' Invalidity Contentions, Sep. 9, 2011.
*Summit 6 LLC*, v. *Research in Motion Corporation, et al.*, Civil Action No. 3:11-CV-00367-0, Exhibit A8 of Defendants' Invalidity Contentions, Sep. 9, 2011.
*Summit 6 LLC*, v. *Research in Motion Corporation, et al.*, Civil Action No. 3:11-CV-00367-0, Exhibit A9 of Defendants' Invalidity Contentions, Sep. 9, 2011.
*Summit 6 LLC*, v. *Research in Motion Corporation, et al.*, Civil Action No. 3:11-CV-00367-0, Exhibit A10 of Defendants' Invalidity Contentions, Sep. 9, 2011.
*Summit 6 LLC*, v. *Research in Motion Corporation, et al.*, Civil Action No. 3:11-CV-00367-0, Exhibit A11 of Defendants' Invalidity Contentions, Sep. 9, 2011.
*Summit 6 LLC*, v. *Research in Motion Corporation, et al.*, Civil Action No. 3:11-CV-00367-0, Exhibit A12 of Defendants' Invalidity Contentions, Sep. 9, 2011.
*Summit 6 LLC*, v. *Research in Motion Corporation, et al.*, Civil Action No. 3:11-CV-00367-0, Exhibit A13 of Defendants' Invalidity Contentions, Sep. 9, 2011.
*Summit 6 LLC*, v. *Research in Motion Corporation, et al.*, Civil Action No. 3:11-CV-00367-0, Exhibit A14 of Defendants' Invalidity Contentions, Sep. 9, 2011.
*Summit 6 LLC*, v. *Research in Motion Corporation, et al.*, Civil Action No. 3:11-CV-00367-0, Exhibit B1 of Defendants' Invalidity Contentions, Sep. 9, 2011.
*Summit 6 LLC*, v. *Research in Motion Corporation, et al.*, Civil Action No. 3:11-CV-00367-0, Exhibit B2 of Defendants' Invalidity Contentions, Sep. 9, 2011.
*Summit 6 LLC*, v. *Research in Motion Corporation, et al.*, Civil Action No. 3:11-CV-00367-0, Exhibit B3 of Defendants' Invalidity Contentions, Sep. 9, 2011.
*Summit 6 LLC*, v. *Research in Motion Corporation, et al.*, Civil Action No. 3:11-CV-00367-0, Exhibit B4 of Defendants' Invalidity Contentions, Sep. 9, 2011.
*Summit 6 LLC*, v. *Research in Motion Corporation, et al.*, Civil Action No. 3:11-CV-00367-0, Exhibit B5 of Defendants' Invalidity Contentions, Sep. 9, 2011.
*Summit 6 LLC*, v. *Research in Motion Corporation, et al.*, Civil Action No. 3:11-CV-00367-0, Exhibit B6 of Defendants' Invalidity Contentions, Sep. 9, 2011.
*Summit 6 LLC*, v. *Research in Motion Corporation, et al.*, Civil Action No. 3:11-CV-00367-0, Exhibit B7 of Defendants' Invalidity Contentions, Sep. 9, 2011.
*Summit 6 LLC*, v. *Research in Motion Corporation, et al.*, Civil Action No. 3:11-CV-00367-0, Exhibit B8 of Defendants' Invalidity Contentions, Sep. 9, 2011.
*Summit 6 LLC*, v. *Research in Motion Corporation, et al.*, Civil Action No. 3:11-CV-00367-0, Exhibit B9 of Defendants' Invalidity Contentions, Sep. 9, 2011.
*Summit 6 LLC*, v. *Research in Motion Corporation, et al.*, Civil Action No. 3:11-CV-00367-0, Exhibit B10 of Defendants' Invalidity Contentions, Sep. 9, 2011.
*Summit 6 LLC*, v. *Research in Motion Corporation, et al.*, Civil Action No. 3:11-CV-00367-0, Exhibit B11 of Defendants' Invalidity Contentions, Sep. 9, 2011.
*Summit 6 LLC*, v. *Research in Motion Corporation, et al.*, Civil Action No. 3:11-CV-00367-0, Exhibit B12 of Defendants' Invalidity Contentions, Sep. 9, 2011.
*Summit 6 LLC*, v. *Research in Motion Corporation, et al.*, Civil Action No. 3:11-CV-00367-0, Exhibit B13 of Defendants' Invalidity Contentions, Sep. 9, 2011.
*Summit 6 LLC*, v. *Research in Motion Corporation, et al.*, Civil Action No. 3:11-CV-00367-0, Exhibit B14 of Defendants' Invalidity Contentions, Sep. 9, 2011.
*Summit 6 LLC*, v. *Research in Motion Corporation, et al.*, Civil Action No. 3:11-CV-00367-0, Exhibit B15 of Defendants' Invalidity Contentions, Sep. 9, 2011.
*Summit 6 LLC*, v. *Research in Motion Corporation, et al.*, Civil Action No. 3:11-CV-00367-0, Exhibit B16 of Defendants' Invalidity Contentions, Sep. 9, 2011.
*Summit 6 LLC*, v. *Research in Motion Corporation, et al.*, Civil Action No. 3:11-CV-00367-0, Exhibit B17 of Defendants' Invalidity Contentions, Sep. 9, 2011.
*Summit 6 LLC*, v. *Research in Motion Corporation, et al.*, Civil Action No. 3:11-CV-00367-0, Exhibit B18 of Defendants' Invalidity Contentions, Sep. 9, 2011.
*Summit 6 LLC*, v. *Research in Motion Corporation, et al.*, Civil Action No. 3:11-CV-00367-0, Exhibit B19 of Defendants' Invalidity Contentions, Sep. 9, 2011.
*Summit 6 LLC*, v. *Research in Motion Corporation, et al.*, Civil Action No. 3:11-CV-00367-0, Exhibit B20 of Defendants' Invalidity Contentions, Sep. 9, 2011.
*Summit 6 LLC*, v. *Research in Motion Corporation, et al.*, Civil Action No. 3:11-CV-00367-0, Exhibit B21 of Defendants' Invalidity Contentions, Sep. 9, 2011.
*Summit 6 LLC*, v. *Research in Motion Corporation, et al.*, Civil Action No. 3:11-CV-00367-0, Exhibit B22 of Defendants' Invalidity Contentions, Sep. 9, 2011.
*Summit 6 LLC*, v. *Research in Motion Corporation, et al.*, Civil Action No. 3:11-CV-00367-0, Exhibit B23 of Defendants' Invalidity Contentions, Sep. 9, 2011.
*Summit 6 LLC*, v. *Research in Motion Corporation, et al.*, Civil Action No. 3:11-CV-00367-0, Exhibit B24 of Defendants' Invalidity Contentions, Sep. 9, 2011.
*Summit 6 LLC*, v. *Research in Motion Corporation, et al.*, Civil Action No. 3:11-CV-00367-0, Exhibit B25 of Defendants' Invalidity Contentions, Sep. 9, 2011.
*Summit 6 LLC*, v. *Research in Motion Corporation, et al.*, Civil Action No. 3:11-CV-00367-0, Exhibit B26 of Defendants' Invalidity Contentions, Sep. 9, 2011.
*Summit 6 LLC*, v. *Research in Motion Corporation, et al.*, Civil Action No. 3:11-CV-00367-0, Exhibit B27 of Defendants' Invalidity Contentions, Sep. 9, 2011.

(56) References Cited

OTHER PUBLICATIONS

Ethan Wilde, "AppleScript for the Internet," Chapters 6, 9 and 16, Peachpit Press, 1998.
Pruett et al., "Visual Basic Controls Desk Reference CD," Waite Group Press, 1995.
Peal, David, "America Online Official Internet Guide," Second Edition, Osborne/McGraw-Hill, 1998.
Godin, Seth, "You've Got Pictures! AOL's Guide to Digital Imaging," AOL Press, 1998.
Lu et al., "e*World—The Official Guide for Macintosh Users," Hayden Books, 1994.
Tyler et al., "Microsoft FrontPage 98," Sams.net Publishing, 1997.
Lehto et al., "Official Microsoft FrontPage 98 Book," Microsoft Press, 1997.
Barbara Kasser, "Using Microsoft PowerPoint 97," Que Corporation, 1997.
Nokia 9000i Communicator Users Manual, 1998.
Smart Messaging Specification, Revision 1.0.0, Nokia Mobile Phones, Ltd., Sep. 15, 1997.
Microsoft Outlook 98 Step by Step, Microsoft Press, 1998.
Timothy Webster, "The Smart Way to Build Web Sites—NetObjects Fusion Handbook," Hayden Books, 1996.
RIM's Supplemental Invalidity Contentions, Civil Action No. 3:11-CV-00367-0, May 4, 2012.
Publication List from Invalidity Contentions, May 14, 2012.
"An Interpersonal Multimedia Visualization System," Richard L. Phillips, Los Alamos National Laboratory, IEEE Computer Graphics and Applications, pp. 20-27 (May 1991).
"Media View, A General Multimedia Digital Publication System," Richard L. Phillips, Communications of the ACM, pp. 75-83 (Jul. 1991, vol. 34, No. 7).
"Media View: An Editable Multimedia Publishing System Developed with an Object-Oriented Toolkit," Richard L. Phillips, Los Alamos National Laboratory, Usenix (Summer 1991).
"Media Maker," Greg Burd, NeXTWORLD, p. 13 (Fall 1992, vol. 2, No. 3).
"True Spectra Announces the Availability of Photo>Graphics with Full ColorWave 2.0 Support," Business Wire, p. 7250080 (Jul. 25, 1996).
"Toronto-Based Graphics-Engine Developer to Expand Functionality ofHP's Imaging for the Internet; True Spectra's ColorWave to Add Groundbreaking Capabilities to HP's Imaging for Internet," Business Wire, p. 9170271 (Sep. 17, 1997).
"Finally, Graphics Power for OS/2 Users," Kevin Linfield, Computing Canada, p. 28 (Oct. 14, 1997).
"Grubb & Ellis Uses TrueSpectra Image Server to Enhance Intranet Capabilities," Business Wire (Dec. 2, 1998).
"True Spectra Debuts Iris Image Server Solutions; New Technology Addresses Critical Visual Requirements for Making E-commerce the Dominant Selling Medium," Business Wire, p. 0161 (Apr. 14, 1999).
"True Spectra Announces Support for Sun's Java Advanced Imaging API; Imaging Solution for E-commerce Embraces Java Technology," Business Wire, p. 0246 (Jun. 15, 1999).
"Picture Works Technology Inc. Aggressively Develops Imaging Intensive E-commerce Solutions Using 1IP and FlashPix Technologies," Business Wire, p. 6250179, (Jun. 25, 1998).
"Internet: PictureWorks Builds Imaging for E-Commerce," Network Briefing (Jun. 29, 1998).
"Getting Started with RealPublisher™ Version 5.1," RealNetworks, Inc. (1998).
"Getting Started with RealPublisher™ Premiere Plug-in Version 5.0," RealNetworks, Inc. (1997).
"RealFlash and RealAudio Content Creation Guide Beta 5.0," RealNetworks, Inc. (1997).
http://web.archive.org/web/19980215082307/http://www8.real.com/publisher/hpindex.html#webpages "Add Audio and Video to Your Web Pages with RealPublisher™," RealNetworks, Inc. (Feb. IS, 1998).
http://web.archive.org/web/19980215084737/http: //www8.real.com/publisher/resources.html "RealPublisher Resources," RealNetworks, Inc. (Feb. 15, 1998).
http://web.archive.org/web/19980215093245/http://www8.real.com/publisher/quickstart.html "Quick Start Online Guide," RealNetworks, Inc. (Feb. 15, 1998).
http://web.archive.org/web/19980211180507/http://service.real.com/help/faq/rpub5faqa1.htm "RealPublisher 5.0 & 5.1 Frequently Asked Questions, Encoding Questions," RealNetworks, Inc. (Feb. 11, 1998).
http://web.archive.org/web/19980211180513/http://service.real.com/help/faq/rpub5faqa2.htm "RealPublisher 5.0 & 5.1 Frequently Asked Questions, Publishing Questions," RealNetworks, Inc. (Feb. 11, 1998).
http://web.archive.org/web/9980211180520/http://service.real.com/help/faq/rpub5faqa3.htm "RealPublisher 5.0 & 5.1 Frequently Asked Questions, Special Topics Questions," RealNetworks, Inc. (Feb. 11, 1998).
http://web.archive.org/web/19980211180539/http://service.real.com/help/faq/rpub5faqa4.Htm "RealPublisher 5.0 & 5.1 Frequently Asked Questions, RealPublisher 5.1 Specific Questions," RealNetworks, Inc. (Feb. 11, 1998).
"Pictra first to make publishing and sharing photo albums over the Internet a snap for PC uses; award-winning software offers easy, fun way to create digital photo albums to share over Internet," Business Wire (May 12, 1997).
"Pictra Puts Your Photo Album on the Web for Free," Glenn McDonald, PCWorld (Jun. 13, 1997).
"Put Your Photo Album on the Web," Glenn McDonald, PCWorld, p. 128 (Sep. 1997).
"Software and CD-ROM Reviews on File," p. 537 (Sep. 1997, vol. 13, Issue 9).
Stan Miastkowski, "WinFax Pro takes the pain out of sharing fax/modems," Infoworld, Oct. 11, 1993.
Announcing WinFax Pro, Version 2.0, Aug. 26, 1991.
Claim Construction Order, Civil Action No. 3:II-cv-367-0, May 21, 2012.
RealAudio and RealVideo Content Creation Guide Version 5.0, RealNetworks, Inc.
Inside MAPI, Irving De la Cruz and Les Thaler, Microsoft Press (1996).
RealPublisher, Getting Started with RealPublisher, Part I, Version 5.1, RealNetworks, Inc., 1998.
Mobile Data Report, New Software Allows Most Windows Files to be Sent with MASC Mobidem Via Ram, vol. 6, No. 20, Oct. 10, 1994.
Info Access, Inc., HTML Transit—HTML Conversion Tool, Jan. 12, 1998.
Nebel et al., Form-Based File Upload in HTML, Nov. 1995. 1.
Nebel, Ernesto, File Upload in HTML Forms, Sep. 23, 1994.
Point2 Internet Systems, Inc., Point2 Equipment Exchange, Making the World a Smaller Place.
HTML 4.0 Specification, Dec. 18, 1997.
Point2 Internet Systems, Inc. website screen shots, 1996-2000.
PictureWorks Technology, Inc. website screen shots, 1996-1998.
Transcript of Trial, vol. 1, 3:11-cv-00367-o, Dallas, TX, Mar. 29, 2013.
Transcript of Trial, vol. 2, 3:11-cv-00367-o, Dallas, TX, Mar. 29, 2013.
Transcript of Trial, vol. 1, 3:11-cv-00367-o, Dallas, TX, Apr. 1, 2013.
Transcript of Trial, vol. 2, 3:11-cv-00367-o, Dallas, TX, Apr. 1, 2013.
Transcript of Trial, vol. 3, 3:11-cv-00367-o, Dallas, TX, Apr. 1, 2013.
Transcript of Trial, vol. 1, 3:11-cv-00367-o, Dallas, TX, Apr. 2, 2013.
Transcript of Trial, vol. 2, 3:11-cv-00367-o, Dallas, TX, Apr. 2, 2013.
Transcript of Trial, vol. 4A, 3:11-cv-00367-o, Dallas, TX, Apr. 3, 2013.
Transcript of Trial, vol. 2, 3:11-cv-00367-o, Dallas, TX, Apr. 3, 2013.

(56) References Cited

OTHER PUBLICATIONS

Transcript of Trial, vol. 1, 3:11-cv-00367-o, Dallas, TX, Apr. 4, 2013.
Transcript of Trial, vol. 1, 3:11-cv-00367-o, Dallas, TX, Apr. 5, 2013.
Defendants Samsung Electronics Co., Ltd. and Samsung Telecommunications America, LLC's Motion to Strike Plaintiffs Trial Exhibit PX-1003, May 9, 2013.
Order Granting Defendants Samsung Electronics Co., Ltd. and Samsung Telecommunications America, LLC's Motion to Strike Plaintiffs Trial Exhibit PX-1003, May 9, 2013.
Defendants Samsung Electronics Co., Ltd. and Samsung Telecommunications America, LLC's Brief in Support of Their Motion to Strike Plaintiffs Trial Exhibit PX-1003, May 9, 2013.
Defendants Samsung Electronics Co., Ltd. and Samsung Telecommunications America, LLC's Post-Trial Brief Regarding Unenforceability of the '482 Patent Due to Inequitable Conduct, May 20, 2013.
Appendix to Defendants Samsung Electronics Co., Ltd. and Samsung Telecommunications America, LLC's Post-Trial Brief Regarding Unenforceability of the '482 Patent Due to Inequitable Conduct, May 20, 2013.
Part 2 of Appendix to Defendants Samsung Electronics Co., Ltd. and Samsung Telecommunications America, LLC's Post-Trial Brief Regarding Unenforceability of the '482 Patent Due to Inequitable Conduct, May 20, 2013.
Part 3 of Appendix to Defendants Samsung Electronics Co., Ltd. and Samsung Telecommunications America, LLC's Post-Trial Brief Regarding Unenforceability of the '482 Patent Due to Inequitable Conduct, May 20, 2013.
Part 4 of Appendix to Defendants Samsung Electronics Co., Ltd. and Samsung Telecommunications America, LLC's Post-Trial Brief Regarding Unenforceability of the '482 Patent Due to Inequitable Conduct, May 20, 2013.
Part 5 of Appendix to Samsung Electronics Co., Ltd. and Samsung Telecommunications America, LLC's Post-Trial Brief Regarding Unenforceability of the '482 Patent Due to Inequitable Conduct, May 20, 2013.
Defendants Samsung Electronics Co., Ltd. and Samsung Telecommunications America, LLC's Renewed Motion for Judgment as a Matter of Law No. 3: Invalidity, May 20, 2013.
Defendants Samsung Electronics Co., Ltd. and Samsung Telecommunications America, LLC's Brief in Support of Their Renewed Motion for Judgment as a Matter of Law No. 3: Invalidity, May 20, 2013.
Appendix to Defendants Samsung Electronics Co., Ltd. and Samsung Telecommunications America, LLC's Brief in.Support of Their Renewed Motion for Judgment as a Matter of Law No. 3: Invalidity, May 20, 2013.
Part 2 of Appendix to Defendants Samsung Electronics Co., Ltd. and Samsung Telecommunications America, LLC's Brief in Support of Their Renewed Motion for Judgment as a Matter of Law No. 3: Invalidity, May 20, 2013.
Defendants Samsung Electronics Co., Ltd. and Samsung Telecommunications America, LLC's Reply Brief in Support Of Their Motion to Strike Summit 6'S Trial Exhibit PX-I003, Civil Action No. 3:11-cv-367-0, Jun. 5, 2013.
Appendix to Defendants Samsung Electronics Co., Ltd. and Samsung Telecommunications America, LLC's Reply Brief in Support of Their Motion to Strike Summit 6'S Trial Exhibit PX-I003, Civil Action No. 3:11-cv-367-0, Jun. 5, 2013.
Defendants Samsung Electronics Co., Ltd. and Samsung Telecommunications America, LLC's Reply in Support of Their Renewed Motion for Judgment as a Matter of Law No. 3: Invalidity, Civil Action No. 3:11-cv-367-0, Jun. 17, 2013.
Defendants Samsung Electronics Co., Ltd. and Samsung Telecommunications America, LLC's Reply Brief in Support of Their Renewed Motion for Judgment as a Matter of Law No. 3: Invalidity, Civil Action No. 3:11-cv-367-0, Jun. 17, 2013.
Appendix to Defendants Samsung Electronics Co., Ltd. and Samsung Telecommunications America, LLC's Reply Brief in Support of Their Renewed Motion for Judgment as a Matter of Law No. 3: Invalidity, Civil Action No. 3:11-cv367-0, Jun. 17, 2013.
Defendants Samsung Electronics Co., Ltd. and Samsung Telecommunications America, LLC's Reply Post-Trial Brief Regarding Unenforceability of the '482 Patent Due to Inequitable Conduct, Civil Action No. 3:1-cv-367-0, Jun. 17, 2013.
Appendix to Defendants Samsung Electronics Co., Ltd. and Samsung Telecommunications America, LLC's Reply Post-Trial Brief Regarding Unenforceability of the '482 Patent Due to Inequitable Conduct, Civil Action No. 3:11-cv367-0, Jun. 17, 2013.
Memorandum Opinion and Order, Civil Action No. 3:11-cv-367-0, Jun. 26, 2013.
Final Judgment, Civil Action No. 3:11-cv-367-0, Jun. 26, 2013.
Report on the Filing or Determination of an Action Regarding a Patent or Trademark, Civil Action No. 3:11-cv-367-0, Jun. 27, 2013.
*Summit 6 LLC* v. *Research in Motion Corp.*, Civil Action No. 3:11-cv-367-0, Bench Trial Transcript vol. 1, May 6, 2013.
*Summit 6 LLC* v. *Research in Motion Corp.*, Civil Action No. 3:11-cv-367-0, Bench Trial Transcript vol. 2, May 8, 2013.
*Summit 6 LLC* v. *Research in Motion Corp.*, Civil Action No. 3: 11-cv-367-0, Bench Trial Transcript vol. 3, May 13, 2013.
Request for Ex Parte Reexamination for U.S. Pat. No. 7,765,482, Sep. 10, 2013.
*Summit 6 LLC* v. *Samsung Electronics Co., Ltd., and Samsung Telecommunications America, LLC*, Non-Confidential Brief of Plaintiff-Cross Appellant Summit 6, LLC., Summit 6, LLC, Feb. 24, 2014.
*Summit 6 LLC* v. *Samsung Electronics Co., Ltd., and Samsung Telecommunications America, LLC*, Non-Confidential Opening Brief of Defendants-Appellants Samsung Electronics Co., Ltd., and Samsung Telecommunications America, LLC, Dec. 13, 2013.
*Summit 6 LLC* v. *Samsung Electronics Co., Ltd., and Samsung Telecommunications America, LLC*, Non-Confidential Response and Reply Brief of Defendants-Appellants Samsung Electronics Co., Ltd., and Samsung Telecommunications America, LLC, No. 2013-1648, -1651, U.S. Court of Appeals for the Federal Circuit, Dec. 13, 2013.
Final Office Action in Ex Parte Reexamination for U.S. Pat. No. 7,765,482, dated May 21, 2014.
Advisory Action in Ex Parte Reexamination for U.S. Pat. No. 7,765,482, dated May 21, 2014.
Jain et al., "The Design and Performance of MedJava," Proceedings of the 4th USENIX Conference on Object-Oriented Technologies and Systems (COOTS), Apr. 27-30, 1998.
J. Ahuja, "Client Server Applications in Java," PACE University, Thesis Masters of Science in Computer Science, Dec. 1997.
Gosling et al., "The Java™ Language Environment: A White Paper," Sun Microsystems, May 1996.
Wutka et al., "Java Expert Solutions," Web Based Programming Tutorials, 1997.
"Microsoft Announces ActiveX Technologies," Microsoft News Center, Mar. 12, 1996.
"Using ActiveX Controls in Visual InterDev Web Applications," Microsoft Corporation, Aug. 1998.
M. Morrison, "Java Unleashed: Everything You Need to Know to Master Java!", 1996.
Y. Sauvageau, "Java Tip 57: Applet parameterization via class reflection," Aug. 1, 1998.
"The New IEEE Standard Dictionary of Electrical and Electronics Terms," Fifth Edition, 1993.
S. Yegulap, "Subdivide and Conquer," Winmag.com, Oct. 17, 1997.
D. McNett, "Secure Encryption Challenged by Internet-Linked Computers," Oct. 22, 1997.
"ET, Phone SETI@Home!", NASA Science, May 23, 1999.
Swank et al., Visual Basic 5, Web Database Developer's Guide, 1997.
M. Richards, "Oracle Unleashed," 1996.
AspUpload, 1999.
AspUpload 1.4, User Manual, 1998.

(56) References Cited

OTHER PUBLICATIONS

Zedler et al., "I-Media: An Integrated Media Server and Media Database as a Basic Component of a Cross Media Publishing System," Comput. & Graphics, vol. 21, No. 6, pp. 693-702, 1997.
E. Kim, "CGI Programming Unleashed," 1996.
Brophy et al., "Teach Yourself VBScript in 21 Days," 1996.
L. Pena, "SlitImage class," Aug. 25, 1997.
L. Pena, "FileSplit," Oct. 12, 1997.
Defendants Preliminary Invalidity Contentions, Exhibit A2, Civil Action No. 7:14-cv-00014, Aug. 11, 2014.
Defendants Preliminary Invalidity Contentions, Exhibit A4, Civil Action No. 7:14-cv-00014, Aug. 11, 2014.
Defendants Preliminary Invalidity Contentions, Exhibit A8, Civil Action No. 7:14-cv-00014, Aug. 11, 2014.
Defendants Preliminary Invalidity Contentions, Exhibit B1, Civil Action No. 7:14-cv-00014, Aug. 11, 2014.
Defendants Preliminary Invalidity Contentions, Exhibit B2, Civil Action No. 7:14-cv-00014, Aug. 11, 2014.
Defendants Preliminary Invalidity Contentions, Exhibit B12, Civil Action No. 7:14-cv-00014, Aug. 11, 2014.
Defendants Preliminary Invalidity Contentions, Exhibit B18, Civil Action No. 7:14-cv-00014, Aug. 11, 2014.
Defendants Preliminary Invalidity Contentions, Exhibit B20, Civil Action No. 7:14-cv-00014, Aug. 11, 2014.
Defendants Preliminary Invalidity Contentions, Exhibit B26, Civil Action No. 7:14-cv-00014, Aug. 11, 2014.
Defendants Preliminary Invalidity Contentions, Exhibit B27, Civil Action No. 7:14-cv-00014, Aug. 11, 2014.
Defendants Preliminary Invalidity Contentions, Exhibit C1, Civil Action No. 7:14-cv-00014, Aug. 11, 2014.
Defendants Preliminary Invalidity Contentions, Exhibit C2, Civil Action No. 7:14-cv-00014, Aug. 11, 2014.
Defendants Preliminary Invalidity Contentions, Exhibit C12, Civil Action No. 7:14-cv-00014, Aug. 11, 2014.
Defendants Preliminary Invalidity Contentions, Exhibit C18, Civil Action No. 7:14-cv-00014, Aug. 11, 2014.
Defendants Preliminary Invalidity Contentions, Exhibit C23, Civil Action No. 7:14-cv-00014, Aug. 11, 2014.
Defendants Preliminary Invalidity Contentions, Exhibit C24, Civil Action No. 7:14-cv-00014, Aug. 11, 2014.
Defendants Preliminary Invalidity Contentions, Exhibit C25, Civil Action No. 7:14-cv-00014, Aug. 11, 2014.
C. Walnum, "Java by Example," 1996.
NeXTSTEP Applications Manual, Chapters 7-8, 1990.
NeXTSTEP 3.0 User's Guide, Chapters 13-14, 1992.
NeXTSTEP 3 Quick Start Guide, showing usage of NeXTMail, 1994.
NeXTCube Marketing Piece (12" square 'Cube' print) showing usage of NeXTMail, 1989.
NeXTCube Marketing Piece (12" square 'Cube' print) showing usage of NeXTMail, 1990.
NeXTSTEP O/S Overview, Marketing Material, showing usage of NeXTMail, Release 3.0 (1992, Release for Intel Processors (1993), NeXTSTEP PA-RISC, Sparc, intel, NeXT (1993-1995), NextSTEP 486 (preliminary doc 1992), 1992-1995.
NeXTSTEP Development "Leverage", Marketing Material, showing usage of NeXTMail, 1992.
Why the World Needs a New Computer, Marketing Material, showing usage of NeXTMail, 1991.
NeXTSTEP 3.0 Here's How Guide, showing usage of NeXTMail, 1990-1992.
NeXT User's Reference, 1991.
NeXTSTATION, 1992.
NeXTSTEP Network and System Administration, NeXTSTEP Developer's Library, Release 3, NeXT Computer, Inc., 1992.
*Summit 6, LLC* v. *HTC Corporation et al.*, Declaration of Hsiwen Lo in Support of Defendants' Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 1, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 4, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 5, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 6, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 7, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 4, Part 8, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 5, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 6, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 7, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 8, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 1, Civil Action No. 7:14-cv-

(56) References Cited

OTHER PUBLICATIONS

00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 3, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 9, Part 4, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 1, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 2, Civil Action No. 7:14-cv-00014-O, United States District Court for the Northern District of Texas Wichita Falls Division, Nov. 22, 2014.
*Summit 6, LLC* v. *HTC Corporation et al.*, Declaration of Hsiwen Lo in Support of Defendants' Motion to Amend Preliminary Invalidity Contentions, Exhibit 10, Part 3, Civil Action No. 7:14-cv-00014-O, United States District Court for the Northern District of Texas Wichita Falls Division, Nov. 22, 2014.
Examiner's Answer in Ex Parte Reexamination for U.S. Pat. No. 7,765,482, Jan. 20, 2015.
Rose et al., NeXTSTEP Applications Manual, 1990.
*Summit 6, LLC* v. *HTC Corporation et al.*, Opening Claim Construction Brief of Plaintiff Summit 6, Civil Action No. 7:14-cv-00014-O, United States District Court for the Northern District of Texas Wichita Falls Division, Dec. 29, 2014.
*Summit 6, LLC* v. *HTC Corporation et al.*, Defendants' Opening Claim Construction Brief, Civil Action No. 7:14-cv-00014-O, United States District Court for the Northern District of Texas Wichita Falls Division, Dec. 30, 2014.
*Summit 6, LLC* v. *HTC Corporation et al.*, Amended Joint Claim Construction and Prehearing Statement, Civil Action No. 7:14-cv-00014-O, United States District Court for the Northern District of Texas Wichita Falls Division, Jan. 27, 2015.
*Summit 6, LLC* v. *HTC Corporation et al.*, Defendants' Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Defendants' Memorandum in Support of Their Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Appendix Two to Defendants' Motion to Amend Preliminary Invalidity Contentions, Civil Action No. 7:14-cv-00014-O, United States District Court for the Northern District of Texas Wichita Falls Division, Nov. 22, 2014.
*Summit 6, LLC* v. *HTC Corporation et al.*, Summit 6 LLC's Response to Defendants' Motion to Amend Preliminary Invalidity Contentions, Civil Action No. 7:14-cv-00014-O, United States District Court for the Northern District of Texas Wichita Falls Division, Dec. 15, 2014.
Petition for Inter Partes Review of U.S. Pat. No. 7,765,482, Case No. IPR2015-00685, Feb. 4, 2015.
Declaration of Petitioner's Expert Dr. Andrew Lippman, Case No. IPR2015-00685, Feb. 4, 2015.
Petition for Inter Partes Review of U.S. Pat. No. 7,765,482, Case No. IPR2015-00688, Feb. 4, 2015.
Declaration of Petitioner's Expert Dr. Andrew Lippman, Case No. IPR2015-00688, Feb. 4, 2015.
Petition for Inter Partes Review of U.S. Pat. No. 7,765,482, Case No. IPR2015-00686, Feb. 4, 2015.
Declaration of Petitioner's Expert Dr. Andrew Lippman, Case No. IPR2015-00686, Feb. 4, 2015.
Petition for Inter Partes Review of U.S. Pat. No. 7,765,482, Case No. IPR2015-00687, Feb. 4, 2015.
Declaration of Petitioner's Expert Dr. Andrew Lippman, Case No. IPR2015-00687, Feb. 4, 2015.
Petition for Inter Partes Review of U.S. Pat. No. 8,612,515, Case No. IPR2015-00683, Feb. 4, 2015.
Declaration of Petitioner's Expert Dr. Andrew Lippman, Case No. IPR2015-00683, Feb. 4, 2015.
Petition for Inter Partes Review of U.S. Pat. No. 8,612,515, Case No. IPR2015-00684, Feb. 4, 2015.
Declaration of Petitioner's Expert Dr. Andrew Lippman, Case No. IPR2015-00684, Feb. 4, 2015.
Petition for Inter Partes Review of U.S. Pat. No. 6,895,557, Case No. IPR2015-00680, Feb. 4, 2015.
Declaration of Petitioner's Expert Dr. Andrew Lippman, Case No. IPR2015-00680, Feb. 4, 2015.
Petition for Inter Partes Review of U.S. Pat. No. 6,895,557, Case No. IPR2015-00681, Feb. 4, 2015.
Declaration of Petitioner's Expert Dr. Andrew Lippman, Case No. IPR2015-00681, Feb. 4, 2015.
Petition for Inter Partes Review of U.S. Pat. No. 7,765,482, Case No. IPR2015-00806, Feb. 25, 2015.
Declaration of Petitioner's Expert Paul Clark, Case No. IPR2015-00806, Feb. 25, 2015.
Petition for Inter Partes Review of U.S. Pat. No. 8,612,515, Case No. IPR2015-00807, Feb. 25, 2015.
Declaration of Petitioner's Expert Paul Clark, Case No. IPR2015-00807, Feb. 25, 2015.
*Summit 6, LLC* v. *HTC Corporation et al.*, Defendants' Rule 12(c) Motion for Judgment on the Pleadings and Brief in Support, Civil Action No. 7:14-cv-00014-O, United States District Court for the Northern District of Texas Wichita Falls Division, Mar. 16, 2015.
*Summit 6, LLC* v. *HTC Corporation et al.*, Claim Construction Order, Civil Action No. 7:14-cv-00014-O, United States District Court for the Northern District of Texas Wichita Falls Division, Mar. 21, 2015.
Patent Owner's Preliminary Response for Inter Partes Review of U.S. Pat. No. 6,895,557, Case No. IPR2015-00680, May 19, 2015.
Patent Owner's Preliminary Response for Inter Partes Review of U.S. Pat. No. 6,895,557, Case No. IPR2015-00681, May 19, 2015.
Patent Owner's Preliminary Response for Inter Partes Review of U.S. Pat. No. 8,612,515, Case No. IPR2015-00683, May 19, 2015.
Patent Owner's Preliminary Response for Inter Partes Review of U.S. Pat. No. 8,612,515, Case No. IPR2015-00684, May 19, 2015.
Patent Owner's Preliminary Response for Inter Partes Review of U.S. Pat. No. 7,765,482, Case No. IPR2015-00685, May 19, 2015.
Patent Owner's Preliminary Response for Inter Partes Review of U.S. Pat. No. 7,765,482, Case No. IPR2015-00686, May 19, 2015.
Patent Owner's Preliminary Response for Inter Partes Review of U.S. Pat. No. 7,765,482, Case No. IPR2015-00687, May 19, 2015.
Patent Owner's Preliminary Response for Inter Partes Review of U.S. Pat. No. 7,765,482, Case No. IPR2015-00688, May 19, 2015.
Patent Owner's Preliminary Response for Inter Partes Review of U.S. Pat. No. 7,765,482, Case No. IPR2015-00806, Jun. 15, 2015.
Patent Owner's Preliminary Response for Inter Partes Review of U.S. Pat. No. 8,612,515, Case No. IPR2015-00807, Jun. 15, 2015.
Rimfire Functional Specification Version 1.0 Core Feature Set, revision 4, Apr. 12, 1999.
Pbay Marketing Plan, Picture Works Technology, Inc., Mar. 24, 1999.
White Paper, "Rimfire: The End-to-End Imaging Solution for Content Capture and Delivery," Internet Pictures Corporation, 2000.

(56) References Cited

OTHER PUBLICATIONS

Market Study, "Image Servers—Early Adopter Case Studies," Tony Henning and Future Image, Inc., 2001.
Press Release, "iPIX Acquisition Locks up Internet Picture Market," Mar. 9, 2000.
Press Release, "iPIX to Acquire PictureWorks Technology, Inc. to form End-to-End Internet Imaging Solutions Company," PictureWorks Technology, Inc., Mar. 8, 2000.
iPIX Presentation, "Enhancing Classified Advertising with Visual Data," Don Strickland and Sarah Pate, Oct. 2, 2003.
Woerner et al., "eBay for Dummies," Chapter 13, IDG Books Worldwide, Inc., 1999.
Press Release, "Admission Corp. Granted Web-Based Media Submission Patent," Admission Corporation, Jun. 2, 2005.
Press Release, "AdMission Directories Wins Gold at Yellow Pages Association Annual Industry Excellence Awards; Enhanced, Interactive Ads for IYP Recognized as Marketing Innovation," Business Wire, Mar. 14, 2005.
Overview of Enterprise Solutions, Executive Summary, PictureWorks, Aug. 18, 1998.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, vol. 1, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, vol. 2, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, vol. 3, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, vol. 4, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit C, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit D, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit E, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit F, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit G, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit H, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit I, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit J, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit K, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit L, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit M, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit N, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit O, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit P, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit Q, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit R, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit S, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit T, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit U, Civil Action No. 7:14-cv-00014-O, United States District Court for the Northern District of Texas Wichita Falls Division, May 8, 2015.
*Summit 6, LLC* v. *HTC Corporation et al.*, Expert Report of James A. Storer, PhD. Regarding Invalidity of the Asserted Claims of U.S. Pat. Nos. 7,765,482 and 8,612,515, Exhibit V, Civil Action No. 7:14-cv-00014-O, United States District Court for the Northern District of Texas Wichita Falls Division, May 8, 2015.
*Summit 6, LLC* v. *HTC Corporation et al.*, Invalidity of Representative Claims 38 and 13 of U.S. Pat. No. 7,765,482 Based on Axis

(56) References Cited

OTHER PUBLICATIONS

Products, Civil Action No. 7:14-cv-00014-O, United States District Court for the Northern District of Texas Wichita Falls Division, Oct. 31, 2014.
*Summit 6, LLC* v. *HTC Corporation et al.*, Invalidity of Representative Claims 1 and 20 of U.S. Pat. No. 8,612,515 Based on Axis Products, Civil Action No. 7:14-cv-00014-O, United States District Court for the Northern District of Texas Wichita Falls Division, Oct. 31, 2014.
Axis 200+ Quick Installation Guide, Revision 0.9, Feb. 1998.
Axis 200 User's Manual, Revision 1.6, Oct. 1998.
Axis 240 Camera Server, 1998.
AXIS 200+ and Axis 240 User's Guide, Revision 1.0, Jan. 1999.
AXIS 240 Quick Installation Guide, Revision 1.0, Feb. 1998.
AXIS 240 User's Manual, Revision 1.4, Nov. 1998.
Axis Communications, Remote Monitoring over Phone Lines for Alarm Verification, 1998.
AXIS 200+, Software Version 1.30, Feb. 4, 1998.
AXIS 240, Software Version 1.00, Feb. 26, 1998.
AXIS 240, Software Version 1.01, Mar. 19, 1998.
AXIS 240, Software Version 1.02, May 11, 1998.
Axis Communications, Camera Servers Bring Video Systems to the Internet, 1998.
Axis Communications, Financial Institutions, 1998.
Axis Communications, Weyerhaeuser—Remote Monitoring of Manufacturing Lines, 1998.
Axis Communications, Axis-Equipped Web Camera Sites, 1998.
Axis Communications, Network Camera Servers, 1998.
Axis Communications, The AXIS 200+ Web Camera Has the Jaz, 1998.
Martin Gren, The History of Axis, Oct. 17, 2011.
AXIS 200, Software Version 1.30, Feb. 4, 1998.
AXIS NetEye 200 datasheet.D.
Mona R. Litt, ParentNet Preserves Parents' Peace of Mind, Jul. 15, 1997.
CCTV, Mar. 1, 1998.
*Summit 6, LLC* v. *HTC Corporation et al.*, Defendants' Claim Construction Brief, Appendix Part 3, Civil Action No. 7:14-cv-00014-O, United States District Court for the Northern District of Texas Wichita Falls Division, Dec. 30, 2014.
*Summit 6, LLC* v. *HTC Corporation et al.*, Defendants' Claim Construction Brief, Appendix Part 4, Civil Action No. 7:14-cv-00014-O, United States District Court for the Northern District of Texas Wichita Falls Division, Dec. 30, 2014.
*Summit 6, LLC* v. *HTC Corporation et al.*, Plaintiff Summit 6, LLC's Responsive Claim Construction Brief, Civil Action No. 7:14-cv-00014-O, United States District Court for the Northern District of Texas Wichita Falls Division, Jan. 20, 2015.
*Summit 6, LLC* v. *HTC Corporation et al.*, Appendix in Support of Plaintiff Summit 6, LLC's Responsive Claim Construction Brief, Civil Action No. 7:14-cv-00014-O, United States District Court for the Northern District of Texas Wichita Falls Division, Jan. 20, 2015.
*Summit 6, LLC* v. *HTC Corporation et al.*, Defendants' Responsive Claim Construction Brief, Civil Action No. 7:14-cv-00014-O, United States District Court for the Northern District of Texas Wichita Falls Division, Jan. 20, 2015.
*Summit 6, LLC* v. *HTC Corporation et al.*, Corrected Appendix in Support of Plaintiff Summit 6, LLC's Responsive Claim Construction Brief, Civil Action No. 7:14-cv-00014-O, United States District Court for the Northern District of Texas Wichita Falls Division, Jan. 29, 2015.
*Summit 6, LLC* v. *HTC Corporation et al.*, Appendix in Support of Defendants' Reply Claim Construction Brief, Civil Action No. 7:14-cv-00014-O, United States District Court for the Northern District of Texas Wichita Falls Division, Feb. 3, 2015.
*Summit 6, LLC* v. *HTC Corporation et al.*, Defendants' Reply Claim Construction Brief, Civil Action No. 7:14-cv-00014-O, United States District Court for the Northern District of Texas Wichita Falls Division, Feb. 3, 2015.

*Summit 6, LLC* v. *HTC Corporation et al.*, Appendix in Support of Summit 6's Sur-Reply Claim Construction Brief, Civil Action No. 7:14-cv-00014-O, United States District Court for the Northern District of Texas Wichita Falls Division, Feb. 6, 2015.
*Summit 6, LLC* v. *HTC Corporation et al.*, Summit 6's Sur-Reply Claim Construction Brief, Civil Action No. 7:14-cv-00014-O, United States District Court for the Northern District of Texas Wichita Falls Division, Feb. 6, 2015.
*Summit 6, LLC* v. *HTC Corporation et al.*, Claim Charts, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Mark D. Selwyn in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Mark D. Selwyn in Support of Defendants' Rule 12(C) Motion for Judgment on the Pleadings, Exhibit A, Civil Action No. 7:14-cv-00014-O, United States District Court for the Northern District of Texas Wichita Falls Division, Mar. 16, 2015.
*Summit 6, LLC* v. *HTC Corporation et al.*, Declaration of David J. Silbert in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Philip Ou in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Declaration of Jonathan E. Harris in Support of Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Appendix to Defendants' Rule 12(C) Motion for Judgment on the Pleadings, Civil Action No. 7:14-cv-00014-O, United States District Court for the Northern District of Texas Wichita Falls Division, Mar. 16, 2015.
*Summit 6, LLC* v. *HTC Corporation et al.*, Summit 6's Response to Defendants' Rule 12(C) Motion for Judgment on the Pleadings and Brief in Support, Civil Action No. 7:14-cv-00014-O, United States District Court for the Northern District of Texas Wichita Falls Division, Apr. 6, 2015.
*Summit 6, LLC* v. *HTC Corporation et al.*, Order, Civil Action No. 7:14-cv-00014-O, United States District Court for the Northern District of Texas Wichita Falls Division, May 28, 2015.
*Summit 6, LLC* v. *HTC Corporation et al.*, Transcript of Videotaped Deposition of Emery Berger, Ph.D., Civil Action No. 7:14-cv-00014-O, United States District Court for the Northern District of Texas Wichita Falls Division, Jan. 16, 2015.
*Summit 6, LLC* v. *HTC Corporation et al.*, Transcript of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 1 of Videotaped Deposition of Emery Berger, Ph.D., Civil Action No. 7:14-cv-00014-O, United States District Court for the Northern District of Texas Wichita Falls Division, Jan. 16, 2015.
*Summit 6, LLC* v. *HTC Corporation et al.*, Exhibit 1 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 3 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 4 of Videotaped Deposition of Mark T. Jones, Ph.D., Civil Action No. 7:14-cv-00014-O, United States District Court for the Northern District of Texas Wichita Falls Division, Jan. 29, 2015.

(56) References Cited

OTHER PUBLICATIONS

*Summit 6, LLC* v. *HTC Corporation et al.*, Exhibit 5 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 6 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 7 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 8 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Exhibit 9 of Videotaped Deposition of Mark T. Jones, Ph.D., Civil Action No. 7:14-cv-00014-O, United States District Court for the Northern District of Texas Wichita Falls Division, Jan. 29, 2015.
*Summit 6, LLC* v. *HTC Corporation et al.*, Expert Report of Dr. Tim A. Williams, Ph.D. on the Invalidity of U.S. Pat. No. 7,765,482, Civil Action No. 7:14-cv-00014-O, United States District Court for the Northern District of Texas Wichita Falls Division, May 8, 2015.
*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A1, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A3, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A5, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A6, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A7, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A9, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A10, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit A11, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B3, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B4, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B5, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B6, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B7, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B8, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B9, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B10, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B11, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B13, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B14, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B15, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B16, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B17, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B19, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B21, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B22, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B23, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B24, Civil Action No. 7:14-cv-00014-O, United States District Court for the Northern District of Texas Wichita Falls Division, Aug. 11, 2014.
*Summit 6, LLC* v. *HTC Corporation et al.*, Defendants' Preliminary Invalidity Contentions, Exhibit B25, Civil Action No. 7:14-cv-00014-O, United States District Court for the Northern District of Texas Wichita Falls Division, Aug. 11, 2014.

(56) References Cited

OTHER PUBLICATIONS

*Summit 6, LLC* v. *HTC Corporation et al.*, Defendants' Preliminary Invalidity Contentions, Exhibit C3, Civil Action No. 7:14-cv-00014-0, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C4, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C5, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C6, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C7, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C8, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C9, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C10, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C11, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C13, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C14, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C15, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C16, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C17, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C19, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C20, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C21, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Exhibit C22, Civil Action No. 7:14-cv-00014-O, United States District Court for the Northern District of Texas Wichita Falls Division, Aug. 11, 2014.

*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Sep. 3, 2014.

*Summit 6, LLC* v. *HTC Corporation et al.*, Defendants' Preliminary Invalidity Contentions, Civil Action No. 7:14-cv-00014-O, United States District Court for the Northern District of Texas Wichita Falls Division, Sep. 6, 2014.

*Summit 6, LLC* v. *HTC Corporation et al.*, Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Exhibit B28 of Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Exhibit C26 of Defendants' First Amended Preliminary Invalidity Contentions, Civil Action No. 7:14-cv-00014-O, United States District Court for the Northern District of Texas Wichita Falls Division, Jan. 12, 2015.

*Summit 6, LLC* v. *HTC Corporation et al.*, Expert Report of Dr. Owen Astrachan Regarding the Invalidity of U.S. Pat. No. 7,765,482, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit C, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit D, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit E, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit F, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit G, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit H, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit I, Civil Action No. 7:14-cv-00014-O, United States District Court for the Northern District of Texas Wichita Falls Division, May 8, 2015.

*Summit 6, LLC* v. *HTC Corporation et al.*, Expert Report of Dr. Owen Astrachan Regarding the Invalidity of U.S. Pat. No. 7,765,482, Exhibit J, Civil Action No. 7:14-cv-00014-O, United States District Court for the Northern District of Texas Wichita Falls Division, May 8, 2015.

(56) References Cited

OTHER PUBLICATIONS

*Summit 6, LLC* v. *HTC Corporation et al.*, Expert Report of Dr. Owen Astrachan Regarding the Invalidity of U.S. Pat. No. 7,765,482, Exhibit K, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. Owen Astrachan Regarding the Invalidity of U.S. Pat. No. 7,765,482, Exhibit L, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. Owen Astrachan Regarding the Invalidity of U.S. Pat. No. 7,765,482, Exhibit M, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-1, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-2, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-3, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-4, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-5, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-6, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-7, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-8, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-9, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-10, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-11, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-12, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-13, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-14, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-15, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-16, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-17, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-18, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-19, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-20, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-21, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-22, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-23, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-24, Civil Action No. 7:14-cv-00014-O, United States District Court for the Northern District of Texas Wichita Falls Division, May 8, 2015.
*Summit 6, LLC* v. *HTC Corporation et al.*, Expert Report of Dr. V. Michael Bove, Jr., Appendix C-25, Civil Action No. 7:14-cv-00014-O, United States District Court for the Northern District of Texas Wichita Falls Division, May 8, 2015.
Institution of Inter Partes Review of U.S. Pat. No. 8,612,515, Case No. IPR2015-00807, Sep. 9, 2015.
Institution of Inter Partes Review of U.S. Pat. No. 7,765,482, Case No. IPR2015-00806, Sep. 9, 2015.
Granting Motion to Stay Ex Parte Reexamination Control No. 90/012,987, Case No. IPR2015-00806, Sep. 9, 2015.
Petition for Inter Partes Review of U.S. Pat. No. 7,765,482, Case No. IPR2016-00029, Oct. 8, 2015.
Petitioner's Motion for Joinder in Inter Partes Review of U.S. Pat. No. 7,765,482, Case No. IPR2016-00029, Oct. 8, 2015.
*Summit 6, LLC* v. *Samsung Electronics Co., Ltd., and Samsung Telecommunications America, LLC*, Appeal Decision, No. 2013-1648, -1651, U.S. Court of Appeals for the Federal Circuit, Sep. 21, 2015.
Patent Owner's Response for Inter Partes Review of U.S. Pat. No. 7,765,482, Case No. IPR2015-00806, Dec. 9, 2015.
Declaration of Paul Clark, Case No. IPR2015-00806 and IPR2015-00807, Nov. 18, 2015.
Declaration of Dr. Martin Kaliski, Case No. IPR2015-00806 and IPR2015-00807, Dec. 9, 2015.
Declaration of Sarah Pate, Case No. IPR2015-00806 and IPR2015-00807, Dec. 9, 2015.

(56) References Cited

OTHER PUBLICATIONS

Patent Owner's Response for Inter Partes Review of U.S. Pat. No. 8,612,515, Case No. IPR2015-00807, Dec. 9, 2015.
Office Action in U.S. Appl. No. 12/831,503, dated Feb. 29, 2016.
Corrected Petitioner's Reply to Patent Owner's Response in Inter Partes Review of U.S. Pat. No. 7,765,482, Case No. IPR2015-00806, Mar. 10, 2016.
Corrected Petitioner's Reply to Patent Owner's Response in Inter Partes Review of U.S. Pat. No. 8,612,515, Case No. IPR2015-00807, Mar. 10, 2016.
Petitioner's Reply to Patent Owner's Response in Inter Partes Review of U.S. Pat. No. 7,765,482, Case No. IPR2015-00806, Mar. 9, 2016.
Petitioner's Reply to Patent Owner's Response in Inter Partes Review of U.S. Pat. No. 8,612,515, Case No. IPR2015-00807, Mar. 9, 2016.
Transcript of Deposition of Sarah Pate, Case Nos. IPR2015-00806 and IPR2015-00807, Feb. 18, 2016.
Transcript of Deposition of Scott Lewis, Case Nos. IPR2015-00806 and IPR2015-00807, Feb. 19, 2016.
Declaration of Gary Frazier, Case Nos. IPR2015-00806 and IPR2015-00807, Feb. 19, 2016.
Declaration of Scott Lewis, Case Nos. IPR2015-00806 and IPR2015-00807, Dec. 9, 2015.
Transcript of Deposition of Gary Frazier, Case Nos. IPR2015-00806 and IPR2015-00807, Mar. 29, 2016.
Corrected Petitioner's Reply to Patent Owner's Response in Inter Partes Review of U.S. Pat. No. 7,765,482, Case No. IPR2015-00806, Apr. 1, 2016.
Corrected Petitioner's Reply to Patent Owner's Response in Inter Partes Review of U.S. Pat. No. 8,612,515, Case No. IPR2015-00807, Apr. 1, 2016.
Declaration of Gary Frazier, Case Nos. IPR2015-00806 and IPR2015-00807, Mar. 9, 2016.
Decision, Institution of Inter Partes Review, Motion for Joinder, Case No. IPR2016-00029, Apr. 4, 2016.
Final Written Decision, Case No. IPR2015-00806, Sep. 6, 2016.
Final Written Decision, Case No. IPR2015-00807, Sep. 6, 2016.
Office Action, U.S. Appl. No. 15/241,213, dated Jun. 27, 2017.
Office Action, U.S. Appl. No. 12/831,503, dated May 16, 2017.
Office Action, U.S. Appl. No. 13/039,676, dated Jun. 2, 2017.
*Summit 6 LLC* v. *Google Inc.*, Opening Brief for Appellant Summit 6, 2017-1184, -1185, United States Court of Appeals for the Federal Circuit, Mar. 3, 2017.
*Summit 6 LLC* v. *Google Inc.*, Appellees Samsung Electronics Co., Ltd. And Google Inc.'s Response Brief, 2017-1184, -1185, United States Court of Appeals for the Federal Circuit, May 12, 2017.
*Summit 6 LLC* v. *Google Inc.*, Reply Brief for Appellant Summit 6, 2017-1184, -1185, United States Court of Appeals for the Federal Circuit, May 26, 2017.

\* cited by examiner

Homes  Realtor Services

Getting Started | Send Photos | Homes | Financing | Offer & Closing | Help

Adding Photos to your listings

Get better exposure for your listings by including some pictures of the property. Its easy! Just locate the folder on your computer containing your photos, and then drag them into the boxes below. Select a descriptive caption for each photo and then click the "Send Photos" button.

*Frequently Asked Questions* ①

| Drag Photo Here | Drag Photo Here | Drag Photo Here | Drag Photo Here |
| Front View ▽ | Front View ▽ | Front View ▽ | Front View ▽ |

Listing Name [          ]

[ Send Photos ]

Today's Rates
30-Year Fixed      6.75%
15-Year Fixed      6.45%
1-Year Adjustable  5.6%
*National average rates

[ Find a Loan ]  [ Rate News ]

Highlights
Welcome to Homes!
We hope you enjoy our site
Please send us your feedback

Home & Rate Trackers
Receive free e-mail updates

*FIG. 1*

PWImageControl Interface:

| Interface Name | Type | Definition | Signature |
|---|---|---|---|
| ScaleImage | function | Scales an image in place or to a temporary file | ScaleImage( destinationType as String, changeDimensions as Integer, destWidth As Integer, destHeight As Integer, destQuality As Integer, '0-100 generateOutputFilename As Boolean ' create tempfile ) As String |
| DelTempFile | sub | Deletes temporary file created with ScaleImage | DelTempFile() |
| fileName | String property | Name of file shown in image well | fileName as String |
| imageName | String property | String value from image caption box | imageName as String |
| ClearImage | sub | Clears the image from the display and redisplays the logo and instructional text | ClearImage() |
| backgroundColor | String property | Hexidecimal RGB string value in format "FFFFFF" or "#FFFFFF" | backgroundColor as String |
| textColor | String property | Hexidecimal RGB string value in format "FFFFFF" or "#FFFFFF" | textColor as String |

FIG. 3

PWMediaSendControl Interface:

| Interface Name | Type | Definition | Signature |
|---|---|---|---|
| SubmitMediaRequest | function | Transfers image and returns a status code. The action is successful if the return code is 0. If non-zero return code examine ServerRetString for a reason. | SubmitMediaRequest(<br>UserID As String, 'partner UID<br>Password As String, 'partner password<br>ServiceType As String, "HOST" or "MIRROR"<br>IndustryCode As Integer, 'e.g., 65=real estate<br>MediaType As Integer, '1=image 2=video 3=sound<br>OpCode As Integer, '1=Add, 2=Update, 3=Delete<br>IPAddr As String, 'Destination IP address<br>filename As String, 'File to send<br>MediaGroupID As String, 'Used to build unique key<br>MediaExtendedID As String, ' '''<br>MediaSequenceNum As Integer, ' '''<br>Desc1 As String, '255 chars<br>Desc2 As String, '255 chars<br>Desc3 As String<br>preScaled as Integer) as Integer '255 chars |
| ServerRetString | String property | Return value from SubmitMediaRequest. If call made on HOST service, this string contains the IMG SRC url | ServerRetString as String |

FIG. 4A

```
Usage Example (VB Script)
tempFileName=DragImage1.ScaleImage(320, 240, 89, 1) 'scale the image object 'DragImage1'
result=UpHandler.SubmitMediaRequest(                 'transmit to mad central
    UserID,
    Password,
    ServiceType,
    0,
    1,
    1,
    ipAddress,
    tempFileName,
    misNum.Value,
    zipcode,
    imageCount,
    title,
    desc2,
    desc3,
    1)
DragImage3.DelTempFile      'delete the temp file
```

SYSTEM, METHOD AND APPARATUS FOR MEDIA SUBMISSION

This application is a continuation of non-provisional application Ser. No. 14/107,261, filed Dec. 16, 2013, which is a continuation of non-provisional application Ser. No. 13/098,090, filed Apr. 29, 2011 (now U.S. Pat. No. 8,612,515), which is a continuation of non-provisional application Ser. No. 12/831,503, filed Jul. 7, 2010, which is a continuation of non-provisional application Ser. No. 10/961,720, filed Oct. 8, 2004 (now U.S. Pat. No. 7,765,482), which is a continuation of non-provisional application Ser. No. 09/357,836, filed Jul. 21, 1999 (now U.S. Pat. No. 6,895,557). Each of the applications identified above is incorporated by reference herein, in its entirety, for all purposes.

BACKGROUND

Field of the Invention

The present invention relates to the handling, manipulation and processing of digital content and more particularly to the transportation and Internet publishing of digital content, particularly image media objects and rich media.

State of the Art

Much of the phenomenal success of the web is attributable to its graphical nature. Literally, a picture is worth a thousand words. The capture of digital images has become routine, using digital cameras and scanners. Nevertheless, although the handling of images by website creators has achieved a high degree of automation, for the average technology user (the "imaging civilian"), manipulating and sharing digital images over the Internet remains a cumbersome and daunting process. Piecemeal solutions that have been devised for handling digital images require a level of sophistication that is beyond that of the ordinary user. For example, transferring a digital image may require first downloading a FTP program, then installing it, then running it and connecting to an FTP server by typing the server name in the connection dialog, then navigating to the proper subdirectory, selecting the files to be uploaded, making sure that the program is in binary transfer mode, then sending the files. For the imaging civilian, such an involved process can be daunting to say the least.

Additionally, as technologies advance and casual users begin to experiment with other media objects, such as streaming video, 3D objects, slide shows, graphics, movies, and even sound files that accompany imaging data, the processes required to share these rich media types on the Internet becomes exponentially more complicated and prohibitive. As the realization of the Internet as an interactive, content rich medium becomes more and more a reality, the need for enabling the use and distribution of rich content and media on the Internet will become the gating factor to its long term success.

A broad-based solution to the foregoing problem requires a web-based media submission tool that allows for submission of media objects in a convenient, intuitive manner. A company named Caught in the Web, has attempted to create a broad-based media submission tool known as "ActiveUpload". ActiveUpload allows an arbitrary file to be dragged and dropped onto a web page control for upload to the web server. An ActiveUpload control allows users to, without leaving a web page, transfer files to a server (Internet or intranet) by selecting the files on the user's desktop that the user wants to transfer, then dragging them onto the web page. For example, a user, having visited a web page, can contribute pictures, documents, zip files, etc., without having to leave the web page and use an FTP program. Standard web authoring tools can be used to integrate ActiveUpload into web pages and change the behavior of the control.

Although Caught in the Web's ActiveUpload tool simplifies the user experience, it does little toward furthering "backend" automation in the handling and distribution of media objects and has no built in "intelligence" to streamline the process of handling and transporting rich media objects from the front end.

BRIEF DESCRIPTION OF THE DRAWINGS

The present invention may be further understood from the following description in conjunction with the appended drawing. In the drawing:

FIG. 1 is a diagram of an exemplary web page providing media object acquisition functions;

FIG. 3 is a table pertaining to a first portion of the Prepare and Post component design; and FIGS. 4A and 4B illustrate a table pertaining to a second portion of the Prepare and Post component design. FIG. 1 illustrates an example embodiment of a wireless sensor network that can collect and distribute sensor information.

DETAILED DESCRIPTION

Figure 2:
FIG. 2 is a diagram of another exemplary web page providing image acquisition functions.

The present invention, generally speaking, provides an improved web-based media submission tool. As with some existing tools, operation of the tool is drag and drop or the user can "click" to browse a directory to select media objects. Unlike existing tools, the tool provides several unique and valuable functions. For example, the tool provides the user an opportunity to confirm the submission with a visual representation, for example by generating a thumbnail image of the rich media file that has been selected. Additionally, batch submission is provided to allow a user to drag and drop or select a plurality of images or other media objects. Submission from a web page to a web page is also provided for. Even more importantly, the submission tool is configurable to perform a variable amount of intelligent preprocessing on media objects prior to upload. In the case of digital images, the tool can perform sizing and formatting, for example. Information capture is performed with information being uploaded together with the media objects. In an exemplary embodiment, information capture is both user-transparent (e.g., user ID and/or password) and user-visible (e.g., the user can provide captions for media objects). The submission of information about the user and the media objects facilitates automatic integration of the media objects within existing databases.

The following describes the Prepare and Post™ tools, which prepares and submits media objects from inside a standard browser, referred to as the first location, to a second location or server. The media objects may be pictures (images), movies, videos, graphics, sound clips, etc. Although in the following description the submission of images is described in greatest detail, the same principles apply equally to media objects of all descriptions.

The Prepare and Post tools refers to browser-side components which together provide the ability to submit and transport media objects over the web to be stored and served. Using the Prepare and Post tools, end users can submit images in an immediate, intuitive manner. No technical sophistication is required. In particular, understanding technical terms such as JPEG, resolution, pixel, kilobyte, transfer protocol, IP address, FTP etc., is not required, since the Prepare and Post tools handles all of these tasks for the user. The benefits of the Prepare and Post tool are:

a) to the image submitter, the ability to submit media objects to web pages immediately without needing to overcome technical obstacles;

b) to the image submitter, the ability to submit media objects to web pages "as is" without making modifications to the media objects prior to sending.

c) to PictureWorks web site partner, access to a uniform, standardized, reliable and secure channel for media acquisition;

d) to PictureWorks web site partner, access to contributed media "made to order", it meets their imaging specifications every time without human intervention;

e) to PictureWorks web site partner, the ability to provide web site visitors with an easy, error free way to contribute media;

f) to PictureWorks web site partner, access to contributed media in "real time" with no time delays.

The two primary components used in the Prepare and Post tools which carry out these functions are 1) the media object identifier and 2) the media sender.

In general, the media object identifier functions to provide a graphical interface for placing and associating a media object from a user's desktop onto a web page. The media sender carriers out the function of transmitting media objects to a second location.

There are two ways media objects on the first location become associated with a media object identifier. The first is through a "drag and drop" behavior where the user clicks on a media object to select the one they want to submit. The media object is then dragged to the media object identifier. Releasing the mouse button associates the media object with the media object identifier. This behavior is allowed in web browsers that support drag and drop functionality. The Prepare and Post tools enable these browsers to accept media objects via drag and drop by providing the media object identifier as an ActiveX component.

The second way to associate a media object on the first location with the media object identifier is to click on the media object identifier to browse for media objects, then select the media object of choice. This method is made available for web browsers where the media object identifier needs to be a pure Java component. (Such "signed applet browsers" like Netscape Navigator) In this instance, the user may be asked to choose a media object in a similar manner as when choosing a file to be opened, either by graphical navigation or by specifying a path name. For example, a prompt associated with the media object identifier may be displayed prompting the user to click within the media object identifier. Clicking within the media object identifier brings up a browse dialog. Using the browse dialog, the user selects the desired media object, which is then placed in the media object identifier. The Prepare and Post tools will generate a visual representation or thumbnail of the media object, a feature currently not available in signed applet browsers.

Real estate is an example of a prime application of the Prepare and Post tools. "Curb appeal" is of great importance in the realty industry and can only be judged by "drive-bys," which are time-consuming and laborious, or by the availability of images. The Prepare and Post tools make real estate images readily available with a minimal amount of effort.

Referring to FIG. 1, an example is shown of a realty web page featuring the described Prepare and Post tools functionality. The user associates images with a media object identifier via the methods described above and selects appropriate captions for the images, e.g., living room, family room, etc. The captions may be typed in or selected from menus. The user also supplies identifying information, in this instance the MLS listing number. When the user clicks the Send button, the images are uploaded and processed immediately according to the configuration of the Prepare and Post tools.

The Prepare and Post tools also support a batch interface, allowing a plurality of images to be submitted simultaneously as in the case of a professional photographer, for example. The opportunity for user confirmation is again provided, e.g., by displaying a visual representation of the images in the batch.

If a mistake is made such that the wrong image is placed in a media object identifier, the correct image may be placed in the media object identifier. The correct image will replace the mistaken image. Alternatively, the user may remove an image from a media object identifier by right-clicking on the media object identifier and selecting Remove within a resulting pop-up menu.

Note that any number of media object identifiers may be provided on a web page and that the media object identifiers may be separate or grouped. This is evident in FIG. 2. The number of media object identifiers provided on a page can be pre-configured and fixed, allowing no user intervention, or the media object identifiers can be generated dynamically, allowing the user to determine how many media object identifiers they need for media submission. FIG. 2 shows a web page with various sizes of media object identifiers. If a media object identifier is separate, its image will be transmitted separately to the second location. If an media object identifier is part of a group, its image will be transmitted to the second location as part of a group of images that are stored together and cataloged together. Media object identifiers that are associated together as a group are noted as such in the web page interface and transparently in the media object identifier object code. Moreover, a web page may have multiple groups of media object identifiers, or "groups of groups."

The usefulness of images is greatly enhanced by capturing and identifying information about the images and submitting the identifying information with the images. Information may be image-specific, user-specific or both. The submission of information about the user and the media objects facilitates automatic integration of the media objects within existing databases. Information capture may be overt or covert or both. This unique automatic database integration enables the images to be served with the proper web page data. Overt information capture relies upon the user to make menu selections of appropriate captions as illustrated in FIG. 1, or to make text entries within text fields, or both. The Prepare and Post tools are easily customized to accept menu selections and text fields for different applications. Covert information capture occurs by having the web browser automatically pass to the Prepare and Post tools known information such as a user ID or, password used to access the web page.

A key differentiator of the Prepare and Post tools is the browser, or client-side intelligence built into the tools. This intelligence directly provides features including those already outlined such as associating data with media objects, generating a visual representation of the media objects and generating media object identifiers dynamically or in a pre-set manner. Other features are also provided via this intelligence, specifically, the ability to control the width and height of the media object identifier and the ability to preprocess the media objects in any number of ways prior to transporting to a second location. In the case of an image media object for example, the Prepare and Post tools may resize the image, (i.e., increase or decrease its size as defined by either physical dimensions, pixel count, or kilobytes). Compression, for example, is a type of sizing. The Prepare and Post tools may also change the image's file format (a way of a media object being identified as to a "type" or "kind" of media), change the quality setting of the image, crop the image or change the aspect ratio, add text or annotations, encode or combine (including stitching) the media object, or enhance the media object by changing image values, for example, relating to contrast or saturation. This intelligence may be executed in a manner that is transparent to the end user. This transparency allows the end user to submit media to the Prepare and Post tools "as is," since the tools will automatically prepare it to meet the requirements of the second location. Note that, although image submission may involve client-side processing, image processing is not required.

The Prepare and Post tools are available for customers to integrate into their own web pages. The Prepare and Post tools are easily integrated into web sites (customers) to allows those sites to accept media objects from web site visitors (users). Appendix A is a generic HTML HostTemplate illustrating how Prepare and Post components are integrated into a web page. The HTML template file (which is a complete working example) contains instructions and a few small code snippets that the customer pastes into the web page. Integrating the Prepare and Post components requires an Initialization Section, a Configuration Section, an ImageWell (media object identifier) Section, a Submission Section and an ImageUpLoad Control Section. To include the Prepare and Post tools media object identifiers on a web page, the customer cuts and pastes code snippets for these sections from the template into the web page.

The Initialization Section consists of a few lines of JavaScript code that will download all of the needed Prepare and Post submission components.

The Configuration Section overrides various configurable default settings that the customer can control. In the Configuration Section, the media object identifier component is sized and configured to perform any preprocessing of the image that may be desired prior to upload. Configurable parameters include both fixed values for all submissions (per submission values) and fixed values for all images within a submission (per image values), as will be explained presently.

Fixed values for all submissions include DefaultImageWidth and DefaultImageHeight, as well as include DefaultControlWidth and DefaultControlHeight. The former specify the default width and height of the images after they have been compressed for transmission. The latter specify the default width and height of all media object identifiers. To create media object identifiers having different sizes, the customer specifies the desired size when creating the media object identifier. Another fixed value for all submissions is Quality. This determines the quality level of the images after they have been compressed for transmission (0 is the lowest quality/highest compression and 100 is the highest quality/lowest compression).

Fixed values for all media objects within a submission include Key1 and Key2. Key 1 is the primary value that determines the filename of the resulting image file and, consequently, its URL. It is important that each submitted image have a unique name to prevent one image from overwriting another. Key2 is an optional secondary key that is appended to Key1 before the image's filename and URL are created. While default values for Key1 and Key2 can be specified in the configuration section, more likely this value will be supplied from a field in the web form. If the web page form contains a control named "Key1," then its value will be used for this key. For example, the field Key1 might be labeled as "MLS Number" on the web page. Similarly, the field Key2-might be labeled "Zip Code" on the web page. A sequence number is appended to the Key1IKey2 combination. When there are multiple media object identifiers on a page, this will ensure that each image has a unique key.

All media object identifiers on a web page must be contained within an HTML form. A single line of JavaScript code is inserted into the web page (within the HTML form) in each place where a media object identifier is desired. The Media object identifier Section can specify the width and height for each media object identifier. If the width and height are omitted, then the default width and height from the Configuration Section are used.

The Submission Code Section contains HTML code that creates the button that submits both the images to the second locations and the form to the customer's server. Within the Submission Code Section, an HTML "href" parameter is required for the Send Button that causes the images to be sent. After the images have been sent, the web page form will be submitted in the standard manner. The form must define two hidden fields named "url" and imagecount." The imagecount field will contain the number of images actually transmitted. In an exemplary embodiment, the URL for images 2 through "n" are generated by replacing the initial sequence number at the end of the returned URL with the desired image number.

The ImageUpload Control Section holds a small piece of JavaScript code that is placed at the very end of the body section of the web page. This code creates the non-visible Image Upload control, or media sender, that performs the transfer of images from the user's machine to the second location.

The Prepare and Post components support multiple browsers and dynamically adjust their behavior according to the type of browser that is currently running. For example, under supported versions of Microsoft's browsers, media object identifiers are implemented as ActiveX controls, while under supported Netscape browsers, media object identifiers are implemented as Java Applets. This multiple browser support is completely automatic.

Figures 4, 4B:

FIGS. 3 and 4A-4B present further details of the media object identifier and media sender components, respectively.

From the foregoing description, it will be appreciated that the present media submission tool, besides offering convenience to the end user, offers convenience and flexibility to technology partners. In particular, web page integration is designed to facilitate automatic server-side integration of media content.

It will be apparent to those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A non-transitory computer-readable medium having an image submission tool stored thereon for use on a user device, the image submission tool including:
   an image identifier section that when executed, causes the image submission tool to generate a first visual representation of a first image, to associate first text information as a first annotation for the first image or a first replacement image that replaces the first image, and to pre-process the first image or the first replacement image to produce a first pre-processed image, and when executed causes the image submission tool to generate a second visual representation of a second image, to associate second text information as a second annotation for the second image or a second replacement image that replaces the second image, and to pre-process the second image or the second replacement image to produce a second pre-processed image, wherein the pre-processing by the image submission tool is controlled by one or more pre-processing parameters received from a device separate from the user device in a conversion of the first image or the first replacement image and in a conversion of the second image or the second replacement image as specified for use by a receiving party;
   a submission section that when executed, causes the image submission tool to request a confirmation from a user to submit the first pre-processed image; and
   an image upload control section that when executed, causes the image submission tool to transmit the first pre-processed image, and when executed causes the image submission tool to transmit the second pre-processed image, wherein the first pre-processed image and the second pre-processed image are catalogued together.

2. The non-transitory computer-readable medium of claim 1, wherein the first pre-processed image has a compression level as specified by the one or more pre-processing parameters.

3. The non-transitory computer-readable medium of claim 1, wherein the first pre-processed image is cropped in a manner specified by the one or more pre-processing parameters.

4. The non-transitory computer-readable medium of claim 1, wherein the first pre-processed image has a quality as specified by the one or more pre-processing parameters.

5. The non-transitory computer-readable medium of claim 1, wherein the first pre-processed image has an encoding as specified by the one or more pre-processing parameters.

6. The non-transitory computer-readable medium of claim 1, wherein the first image is a video image.

7. The non-transitory computer-readable medium of claim 1, wherein the image upload control section when executed causes the image submission tool to transmit the first text information.

8. The non-transitory computer-readable medium of claim 1, wherein the image upload control section when executed causes the image submission tool to transmit location information associated with the first pre-processed image.

9. The non-transitory computer-readable medium of claim 1, wherein the first pre-processed image and the second pre-processed image are combined into a presentation.

10. A computer implemented method performed by an image submission tool on a user device, comprising:
    generating, by the image submission tool, a first visual representation of a first image, to associate first text information as a first annotation for the first image or a first replacement image that replaces the first image, and to pre-process the first image or the first replacement image to produce a first pre-processed image;
    generating, by the image submission tool, a second visual representation of a second image, to associate second text information as a second annotation for the second image or a second replacement image that replaces the second image, and to pre-process the second image or the second replacement image to produce a second pre-processed image, wherein the pre-processing by the image submission tool is controlled by one or more pre-processing parameters received from a device separate from the user device in a conversion of the first image or the first replacement image and in a conversion of the second image or the second replacement image as specified for use by a receiving party;
    requesting, by the image submission tool, a confirmation from a user to submit the first pre-processed image;
    transmitting, by the image submission tool, the first pre-processed image; and
    transmitting, by the image submission tool, the second pre-processed image, wherein the first pre-processed image and the second pre-processed image are catalogued together.

11. The method of claim 10, wherein the first pre-processed image has a compression level as specified by the one or more pre-processing parameters.

12. The method of claim 10, wherein the first pre-processed image is cropped in a manner specified by the one or more pre-processing parameters.

13. The method of claim 10, wherein the first pre-processed image has a quality as specified by the one or more pre-processing parameters.

14. The method of claim 10, wherein the first pre-processed image has an encoding as specified by the one or more pre-processing parameters.

15. The method of claim 10, wherein the first image is a video image.

16. The method of claim 10, further comprising transmitting, by the image submission tool, the first text information.

17. The method of claim 10, further comprising transmitting, by the image submission tool, location information associated with the first pre-processed image.

18. The method of claim 10, wherein the first pre-processed image and the second pre-processed image are combined into a presentation.

19. A computer implemented method performed by an image submission tool on a user device, comprising:
    generating, by the image submission tool, a first visual representation of a first image, to associate first text information as a first annotation for the first image or a first replacement image that replaces the first image, and to pre-process the first image or the first replacement image to produce a first pre-processed image;
    generating, by the image submission tool, a second visual representation of a second image, and to pre-process the second image or a second replacement image that replaces the second image to produce a second pre-processed image, wherein the pre-processing by the image submission tool is controlled by one or more pre-processing parameters received from a device separate from the user device in a conversion of the first image or the first replacement image and in a conversion of the second image or the second replacement image as specified for use by a receiving party;
    requesting, by the image submission tool, a confirmation from a user to submit the first pre-processed image;

transmitting, by the image submission tool, the first pre-processed image; and transmitting, by the image submission tool, the second pre-processed image, wherein the first pre-processed image and the second pre-processed image are catalogued together.

20. The method of claim 19, wherein the first pre-processed image has a compression level as specified by the one or more pre-processing parameters.

21. The method of claim 19, wherein the first pre-processed image is cropped in a manner specified by the one or more pre-processing parameters.

22. The method of claim 19, wherein the first pre-processed image has a quality as specified by the one or more pre-processing parameters.

23. The method of claim 19, wherein the first pre-processed image has an encoding as specified by the one or more pre-processing parameters.

24. The method of claim 19, wherein the first image is a video image.

25. The method of claim 19, further comprising transmitting, by the image submission tool, the first text information.

26. The method of claim 19, further comprising transmitting, by the image submission tool, location information associated with the first pre-processed image.

27. The method of claim 19, wherein the first pre-processed image and the second pre-processed image are combined into a presentation.

* * * * *